(12) United States Patent
Wikholm et al.

(10) Patent No.: US 11,819,840 B2
(45) Date of Patent: Nov. 21, 2023

(54) PIPETTE TIP FOR AND METHOD OF AUTOMATICALLY MAINTAINING PIPETTE TIP DEPTH IN A FLUID

(71) Applicant: FORMULATRIX, INC., Bedford, MA (US)

(72) Inventors: David Wikholm, Bedford, MA (US); Rasmus Lindblom, Bedford, MA (US)

(73) Assignee: FORMULATRIX, INC., Bedford, MA (US)

( * ) Notice: Subject to any disclaimer, the term of this patent is extended or adjusted under 35 U.S.C. 154(b) by 502 days.

(21) Appl. No.: 16/958,999

(22) PCT Filed: Dec. 20, 2018

(86) PCT No.: PCT/US2018/066714
§ 371 (c)(1),
(2) Date: Jun. 29, 2020

(87) PCT Pub. No.: WO2019/133424
PCT Pub. Date: Jul. 4, 2019

(65) Prior Publication Data
US 2020/0330976 A1    Oct. 22, 2020

Related U.S. Application Data

(60) Provisional application No. 62/611,161, filed on Dec. 28, 2017.

(51) Int. Cl.
*B01L 3/00* (2006.01)
*B01L 3/02* (2006.01)
*G01N 35/10* (2006.01)

(52) U.S. Cl.
CPC ........ *B01L 3/0279* (2013.01); *G01N 35/1016* (2013.01); *B01L 2200/143* (2013.01); *B01L 2300/0645* (2013.01); *G01N 2035/1025* (2013.01)

(58) Field of Classification Search
CPC ..................................................... B01L 3/0279
USPC ..................................................... 73/864.14
See application file for complete search history.

(56) References Cited

U.S. PATENT DOCUMENTS

| 5,045,286 A | 9/1991 | Kitajima et al. |
| 6,551,558 B1 | 4/2003 | Mann et al. |
| 9,346,045 B2 | 5/2016 | Blumentritt et al. |

FOREIGN PATENT DOCUMENTS

WO    2016166729 A1    10/2016

OTHER PUBLICATIONS

International Search Report and Written Opinion issued in counterpart PCT Application No. PCT/US2018/066714 dated Mar. 8, 2019 (ten (10) pages).

*Primary Examiner* — Christine T Mui
*Assistant Examiner* — Emily R. Berkeley
(74) *Attorney, Agent, or Firm* — E. Eric Mills; Todd A. Serbin; Maynard Nexsen PC

(57) ABSTRACT

A pipette tip for and method of automatically maintaining pipette tip depth in a fluid during a fluid transfer operation is disclosed. The pipette tip includes, for example, two electrodes that run substantially the full length of the pipette tip for measuring the resistance therebetween when submerged in a conductive fluid. A method is provided of automatically maintaining the depth of the pipette tip in a liquid throughout a pipetting operation, as the liquid surface rises or falls in its container, without any prior knowledge of the container geometry.

8 Claims, 27 Drawing Sheets

PIPETTE TIP FOR AND METHOD OF AUTOMATICALLY MAINTAINING PIPETTE TIP DEPTH IN A FLUID

CROSS REFERENCE TO RELATED APPLICATIONS

This application is a 35 U.S.C. § 371 U.S. national phase entry of International Application No. PCT/US2018/066714 filed Dec. 20, 2018, which is related to and claims priority under 35 U.S.C. § 119(e) to U.S. Provisional Patent App. No. 62/611,161, entitled "Pipette Tip for and Method of Automatically Maintaining Pipette Tip Depth in a Fluid During a Fluid Transfer Operation," filed on Dec. 28, 2017; the entire disclosures of which are incorporated herein by reference.

TECHNICAL FIELD

The disclosed subject matter relates generally to liquid handling methods, and more particularly, to a pipette tip for and method of automatically maintaining pipette tip depth in a fluid during a fluid transfer operation.

BACKGROUND

Automated liquid handling instruments include robots used to transfer specific quantities of liquids between designated containers. Such instruments are useful in a variety of applications including cell biology, genomics, forensics, and drug research. The instruments assist humans with the repetitive task of delivering liquids in a wide range of volumes by improving the speed and efficiency of the operations, and improving the precision and accuracy of the delivered volumes.

A wide variety of labware containers are typically used in liquid handling applications. Microtiter® plates containing an array of 96, 384, or 1536 sample wells are quite common. Depending on the size and number of sample wells, such plates may hold somewhere between tens of nanoliters to several milliliters of liquid. Also common are larger containers, ranging from vials holding one to two milliliters of liquid, up to large tubes holding tens of milliliters or bottles holding hundreds of milliliters. It can be easily understood that each unique labware container will have a unique relationship between volume of liquid in the container and the height of the liquid surface in the container.

The precision and accuracy of transferred volumes can be affected by many factors. These factors can range from properties of the liquid itself, such as its viscosity or surface tension, to properties of system components, such as the hydrophobicity of the pipette tip, or even environmental conditions, such as ambient temperature and pressure.

In automated liquid handling, control variables of the instrument can have a significant effect on the pipetted volumes. Such control variables include the speed of pump actuation, delay between the end of pump actuation and removal of the pipette tip from the liquid, and/or speed of pipette tip removal from the liquid. One prominent control variable that has a strong effect on pipetting performance is the depth to which the pipette tip is submerged under the surface of the liquid throughout the operation. If the pipette tip is too shallow in the liquid, the vacuum of aspiration may lead to cavitation of the liquid at the opening of the pipette tip, causing air to be aspirated rather than the liquid, and thus causing an error in the aspirated volume. If the pipette tip is too deep in the liquid, a larger surface area of the pipette tip is in contact with the liquid and a greater volume of liquid may cling to the pipette tip as it is retracted from the liquid. Additionally, deeper submersion results in increased hydrostatic pressure at the opening of the pipette tip, which may cause variations in the resulting pipetted volume. Thus, it is best to maintain the pipette tip at the optimal depth, even as the liquid level is changing while liquid is aspirated from or dispensed into a container. Further, it is important to ensure the depth of the pipette tip in the liquid throughout a pipetting operation is consistent from one operation to the next.

Methods for detecting the liquid level in the field of automated liquid handling are common and well established in the art. However, none are capable of tracking the liquid level using real time sensor feedback to maintain the depth of the pipette tip during a pipetting operation. In the current state of the art, liquid level tracking is achieved by predicting the expected liquid level change based on the requested volume and the geometry of the container. The geometry of the container refers to the cross sectional area as it relates to height in the container. From this information, the height change associated with a particular volume change can be calculated. This method requires the container geometry to be characterized and programmed into the instrument protocol prior to a pipetting operation. This requirement can restrict the type of labware used with a particular instrument and adds complexity to the process of programming an instrument for a particular pipetting operation. Moreover, these types of calculations assume that the pipetting operation will aspirate or dispense a uniform, equal volume of liquid during each pipetting action, which may not be an accurate assumption. If the calibration is slightly off, this error can be compound over the course of the pipetting operation, and the actual liquid level may be correspond to the expected liquid level based on the calculations. Consequently, new approaches are needed for tracking the liquid level during a pipetting operation without adding complexity to the process.

An example of the conventional method of liquid level tracking is in U.S. Pat. No. 4,586,546, entitled "Liquid handling device and method," issued on May 6, 1986. The '546 patent describes a device and method for detecting the liquid level in a container and predicting the height of liquid and the desired height of the pipette tip in the container after a certain volume has been added or removed.

There are several other common methods of automatically detecting the level of liquid in a container. The simplest of these is based on pressure measurements. Changes in pressure inside the pipette tip are detected as the pipette tip enters the surface of a liquid. This method does not require any specialized pipette tip designs or features, and in most cases is only viable if the pipette tip is empty. Pressure-based liquid level detection could be performed using any conventional pipette tip. An example of a pressure-based liquid level detection method is in U.S. Pat. No. 4,794,085, entitled "Apparatus and method for detecting liquid penetration by a container used for aspirating and dispensing the liquid," issued on Dec. 27, 1988. The '085 patent describes a pipetting device with a pressure sensor to measure pressure within the device. The pipette tip is moved down toward the liquid in increments. At each stage a syringe pump is actuated to create a pressure differential within the device. If the pipette tip has entered liquid, the opening of the pipette tip will be blocked, and the pressure sensor may detect the pressure differential. Another example is in U.S. Pat. No. 8,287,806, entitled "Pipetting apparatus with integrated liquid level and/or gas bubble detection," issued on Oct. 16, 2012. The '806 patent describes a device for detecting liquid level using pressure measurements. This pipetting device specifies the use of a system liquid, rather than air, between the pump and pipette tip.

The pipette tip design and composition can be enhanced to allow more advanced liquid surface sensing methods. Such enhancement typically involves providing an electrode in the pipette tip so electrical signals can be used to detect the liquid level. The most common enhancement is to make the pipette tip out of electrically conductive plastic and measure capacitance between the conductive pipette tip and a ground plane below the containers holding liquids or samples. An example of capacitance-based liquid level detection is in U.S. Pat. No. 4,736,638, entitled "Liquid level sensor," issued on Apr. 12, 1988. The '638 patent describes a device for sensing liquid levels in fluid transfer mechanisms comprising a conductive member supporting containers of sample liquids and a conductive pipette probe. A capacitance signal is measured between the probe and the supporting ground plane and a change in capacitance is detected when the probe touches a fluid.

The pipette tip design can be further enhanced by providing multiple electrodes within the pipette tip to enable more advanced signal detection. Capacitance can be measured between one or both electrodes and a bottom ground plane, capacitance could be measured between the two electrodes, or electrical impedance could be measured between the two electrodes. An example of an electrical signal based liquid level detection with pipette tips having more than one electrode is in U.S. Pat. No. 5,045,286, entitled "Device for aspirating a fixed quantity of liquid," issued on Sep. 3, 1991. The '286 patent describes a pipette tip with two electrically conductive members arranged in the nozzle such that one electrode extends from the nozzle attachment to the lower end of the nozzle and the other electrode extends from the nozzle attachment to a certain distance or height above the lower end of the nozzle, such that the distance or height corresponds to a fixed quantity of liquid to be aspirated through the nozzle. The '286 patent also discloses various ways to produce such a pipette tip. Another example is in U.S. Pat. No. 6,851,453, entitled "Fluid dispense verification system," issued on Feb. 8, 2005. The '453 patent describes a probe for fluid dispensing with two electrodes with ends longitudinally spaced from each other. A signal is measured between the two electrodes for the purposes of detecting the surface of the liquid and fluid delivery verification. Yet another example is in U.S. Pat. No. 5,550,059, entitled "Fluid sensing pipette," issued on Aug. 27, 1996. The '059 patent describes a probe for fluid dispensing with two concentrically arranged conductive tubes insulated from each other. A signal is measured between the two electrodes for the purpose of detecting the surface of the liquid.

SUMMARY

Disclosed herein is a device, system, and method for pipetting applications. In one aspect, a pipetting device for automatically maintaining a pipette tip depth in a conductive fluid during a fluid transfer operation is described. The pipetting device comprises a pipette tip having a securing end with an opening, a fluid transferring end with an opening, an outer surface, and an inner surface, wherein the outer surface includes an electrically insulating material; a first and a second electrode on the outer surface of the pipette tip, the first and second electrode being separated by the electrically insulating material; a frame supporting an actuator that is operatively connected to the pipette tip, wherein the pipette tip is vertically oriented relative to the frame, and wherein the actuator is adapted to adjust a position of the pipette tip relative to the frame; a controller that is in electrical connection with the first and second electrodes, wherein the first and second electrodes are adapted to send the controller a signal relative to a conductive fluid that comes in contact with the outer surface of the pipette tip; and wherein the controller is adapted to command the actuator to move the position of the pipette tip in response to the signal.

In some embodiments, each of a first and second electrode described herein extends the full longitudinal length of the pipette tip from the securing end to the fluid transferring end. In other embodiments, each of a first and second electrode described herein terminates at a point near the securing end, wherein the point is where the first and second electrodes are electrically connected to the controller. In some instances, each of a first and second electrode described herein terminates at a point near the fluid transferring end, wherein the point is where conductive fluid can reach.

In some instances, a signal from a first and second electrode described herein is a measurement of resistance relative to a conductive fluid. A first and second electrode described herein can be made of copper in some cases, or made of an electrically conductive polypropylene in other cases.

In some embodiments, a pipetting device further comprises first and second electrical points, and first and second electrical wires connecting the first and second electrodes, respectively, to a controller.

In another aspect, a method for automatically maintaining a pipette tip depth in a conductive fluid during a fluid transfer operation is described herein. An exemplary method comprises the steps of: providing a pipetting device, comprising: a pipette tip having a securing end with an opening, a fluid transferring end with an opening, an outer surface, and an inner surface, wherein the outer surface includes an electrically insulating material; a first and a second electrode on the outer surface of the pipette tip, the first and second electrode being separated by the electrically insulating material; a frame supporting an actuator that is operatively connected to the pipette tip, wherein the pipette tip is vertically oriented relative to the frame, and wherein the actuator is adapted to move the height of the pipette tip relative to the frame; and a controller that is in electrical connection with the first and second electrodes; providing a container fixed in height relative to the frame, the container holding a conductive fluid having a first liquid level; positioning the pipette tip in the container such that at least a portion of the first and second electrodes are submerged in the conductive fluid, wherein the positioning step forms a control loop between the first and second electrodes, the actuator, the controller, and the conductive fluid; measuring by the first and second electrodes a change in resistance relative to the conductive fluid; sending by the first and second electrodes a signal to the controller relative to the change, wherein the controller is configured to command the actuator to move the pipette tip vertically in response to the signal.

In some instances, a method described herein can further comprise the steps of: aspirating by the pipette tip an amount of the conductive fluid, wherein the conductive fluid has a second liquid level following the aspirating step; commanding by the controller the actuator to move the pipette tip relative to the second liquid level such that the first and second electrodes remain submerged in the conductive fluid.

In some instances, a method described herein can further comprise the steps of: dispensing by the pipette tip an amount of the conductive fluid, wherein the conductive fluid has a second liquid level following the dispensing step; commanding by the controller the actuator to move the pipette tip relative to the second liquid level such that the first and second electrodes remain submerged in the conductive fluid.

In some embodiments, a method described herein can further comprise the step of: maintaining by the control loop the pipette tip at a constant second liquid level relative to the liquid surface of the conductive fluid.

In yet another aspect, a pipette tip is described herein comprising a body made from an electrically insulating material, the body comprising: an outer surface, and an inner surface; a first electrode disposed on the outer surface; and a second electrode disposed on the outer surface, the second electrode being separated from the first electrode by the electrically insulating material.

In some cases, a body described herein further comprises an apparatus securing end; and a fluid transferring end positioned opposite the apparatus securing end, the fluid transferring end comprising a fluid transferring opening.

In some embodiments, a pipette tip described herein can further comprise a third electrode and a fourth electrode disposed on the inner surface.

Each or all of the electrodes described herein can extend along a full longitudinal length of the body from the fluid transferring end to the apparatus securing end in some cases. In other cases, each or all of the electrodes extend a distance less than a full longitudinal length of the body from the fluid transferring end to the apparatus securing end.

Each of the electrodes described herein, can in some instances, be made of copper or an electrically conductive polypropylene.

In some embodiments, each electrode described herein can comprise an electrical contact tab positioned on the apparatus securing end of the electrode. In some instances, the electrical contact tab can extend to an end of the apparatus securing end, or can extend beyond the apparatus securing end of the pipette tip.

BRIEF DESCRIPTION OF THE DRAWINGS

Figure 1:
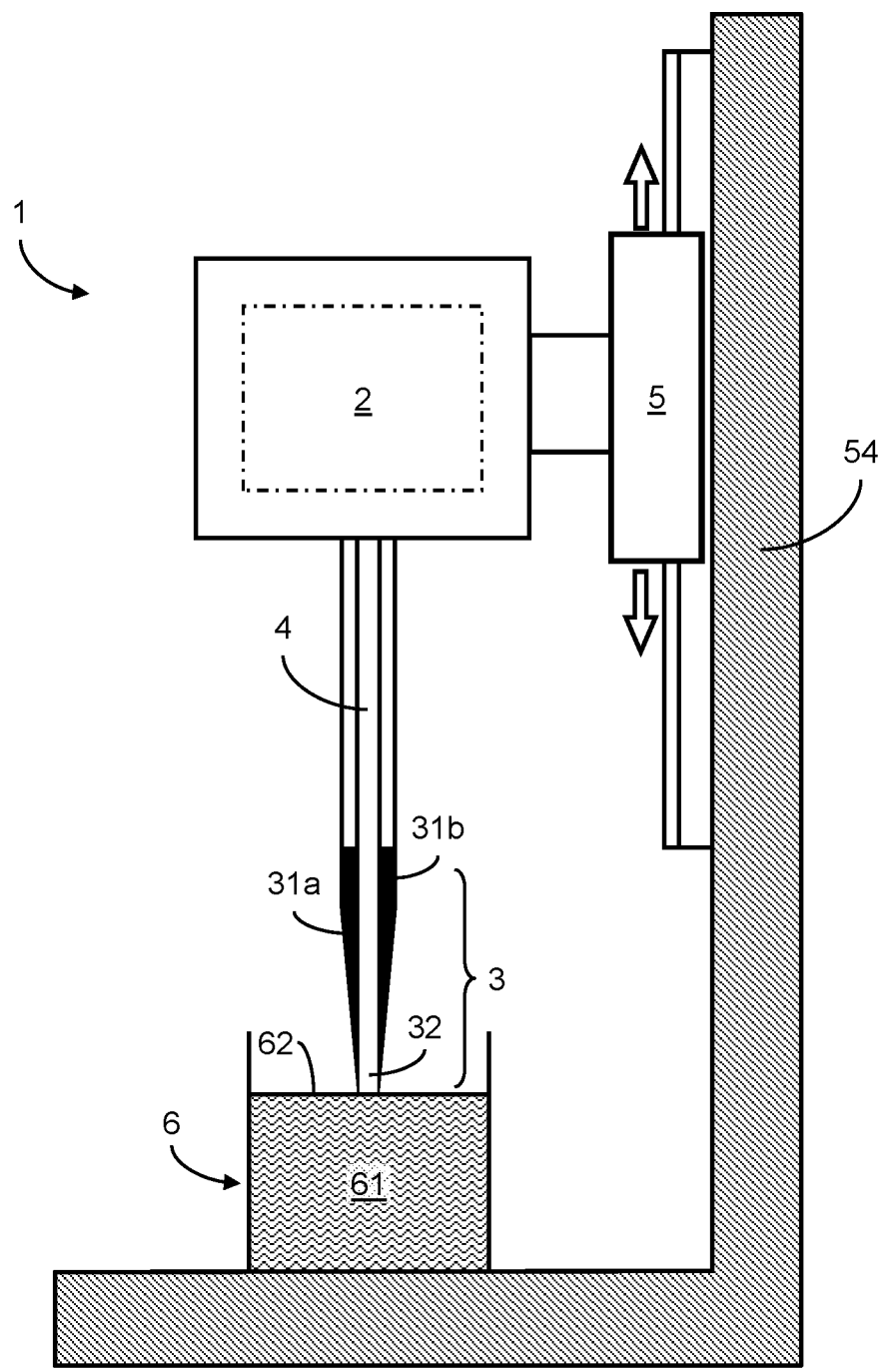
Figure 2A:
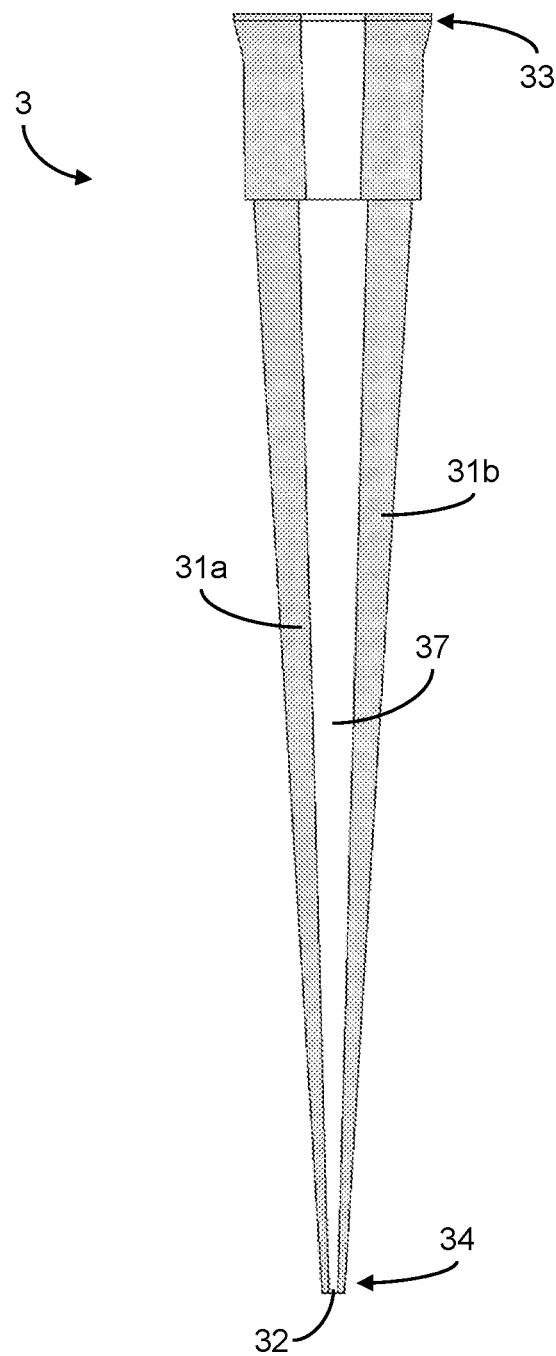
Figure 2B:
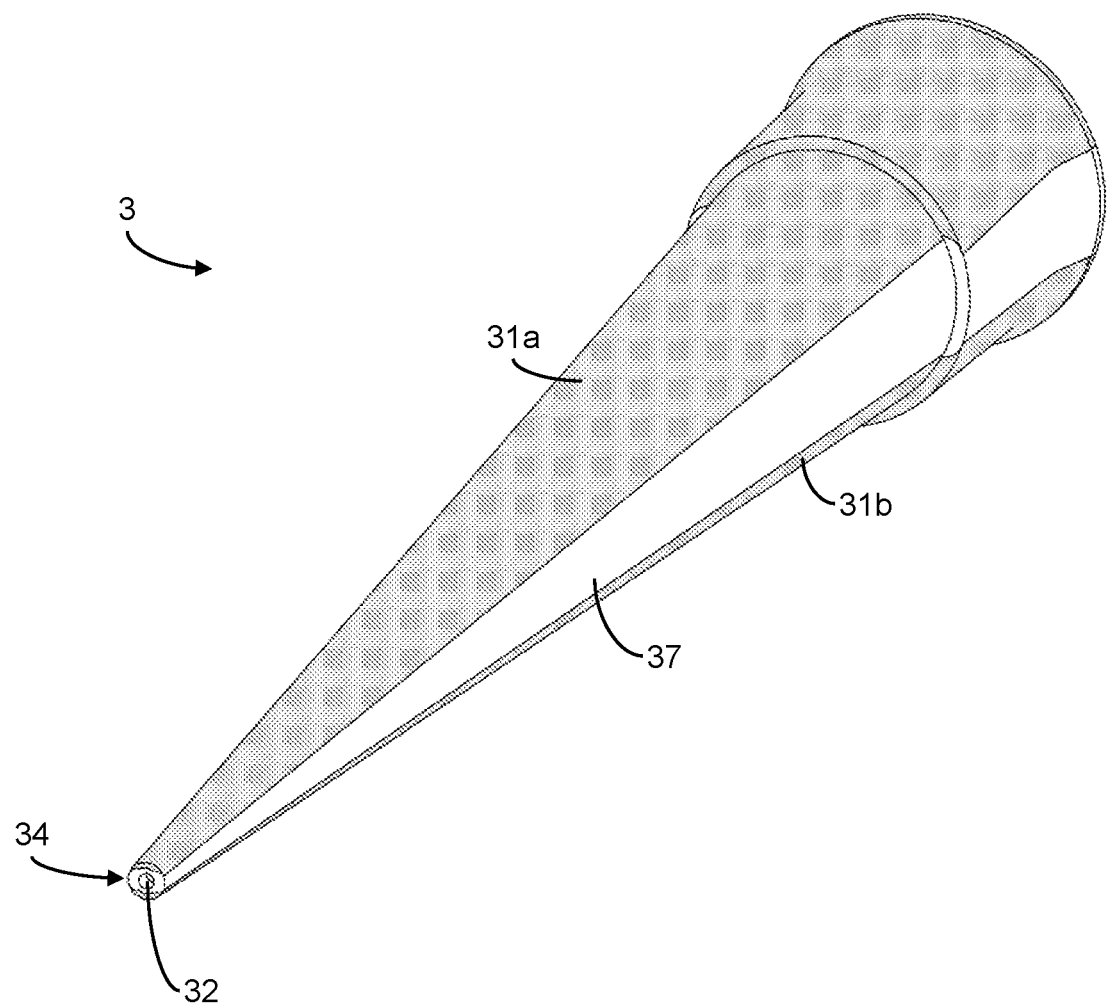
Figure 2C:
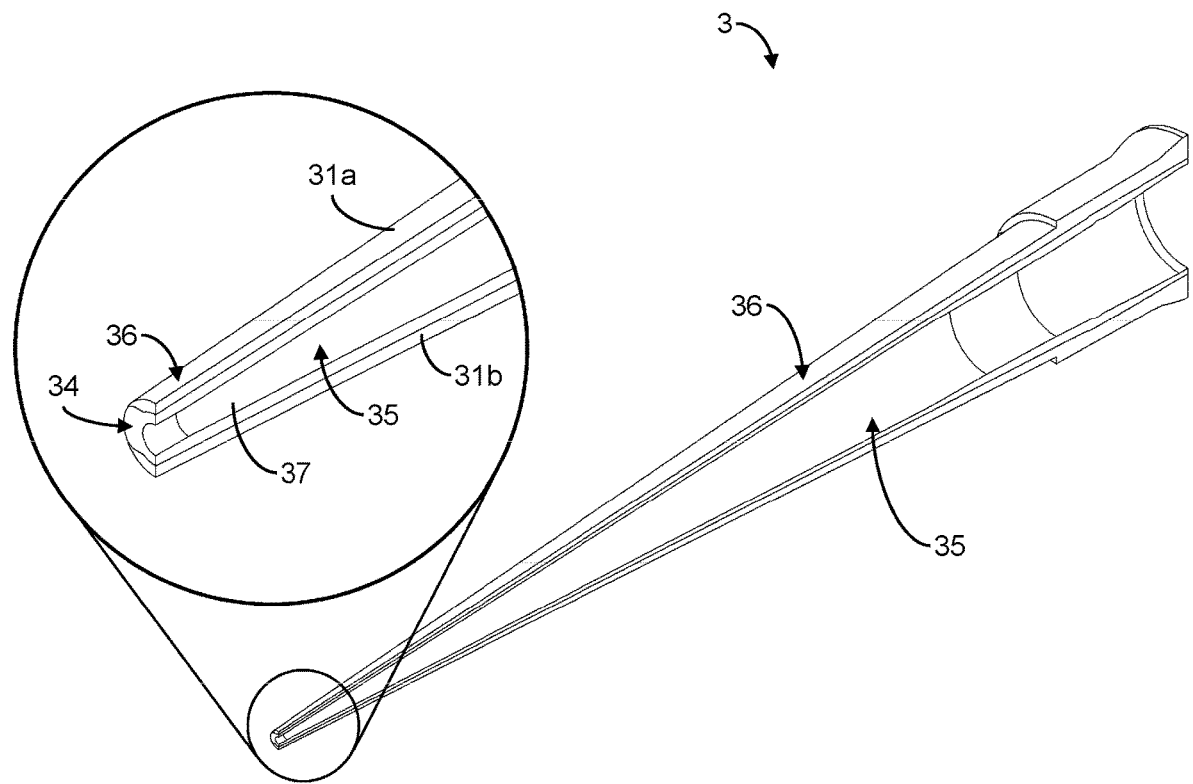
Figure 3A:
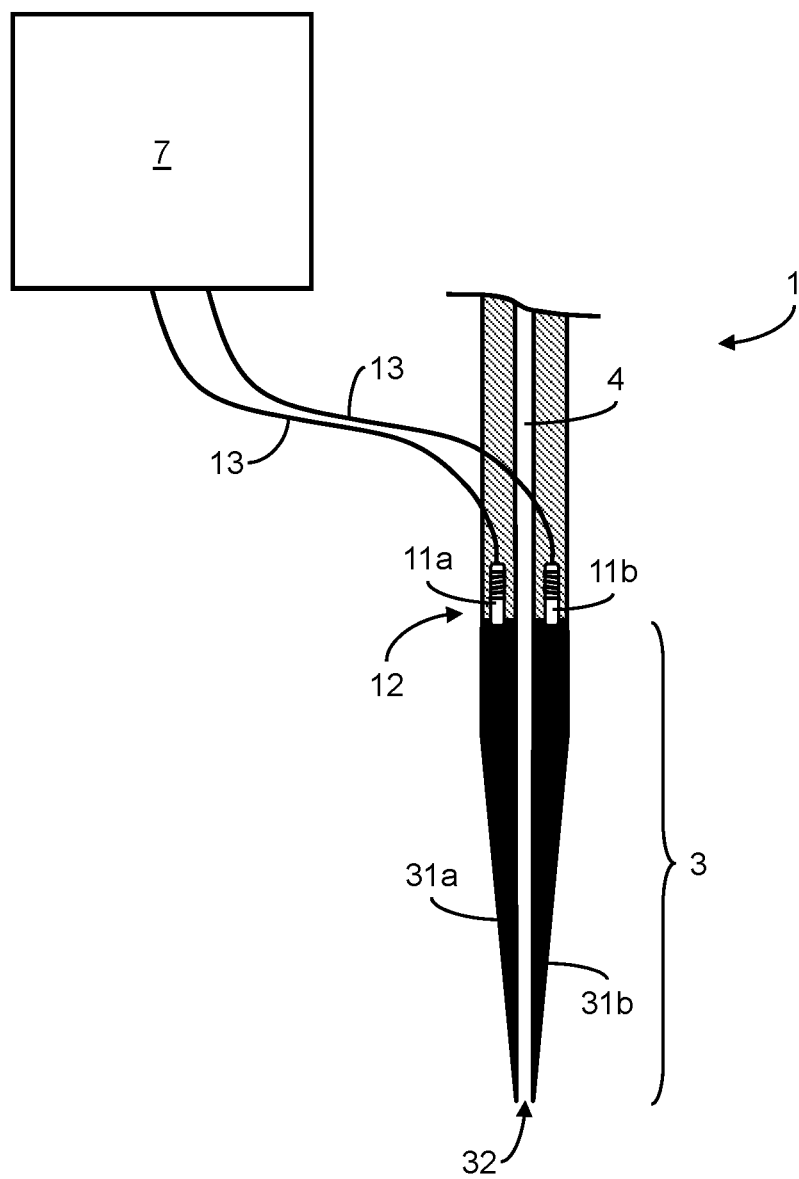
Figure 3B:
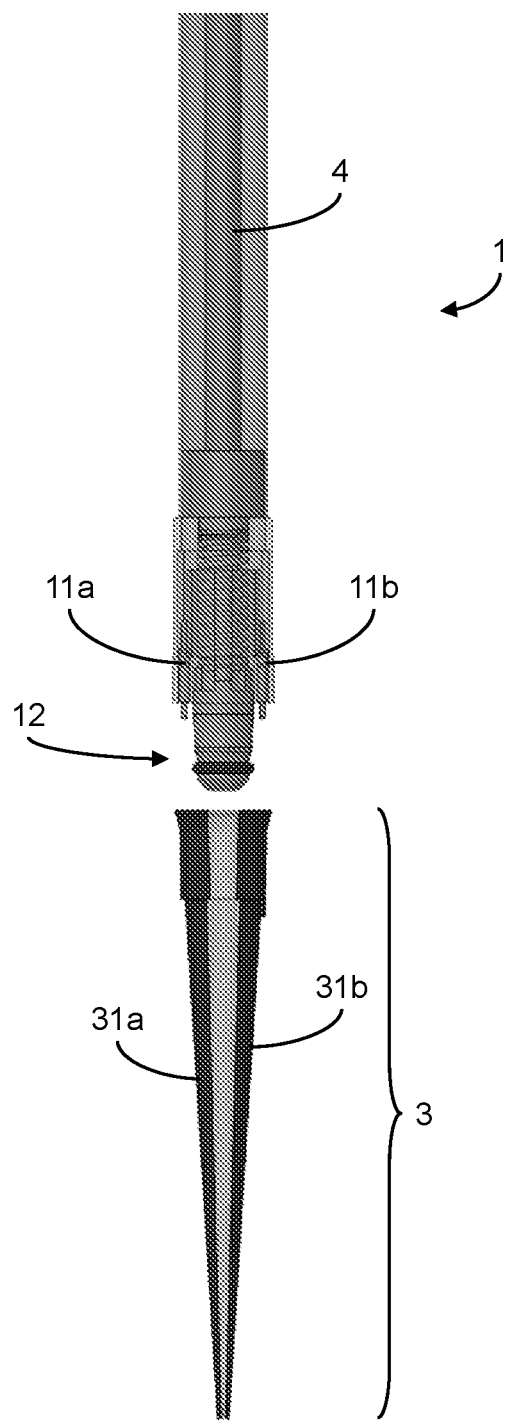
Figure 4A:
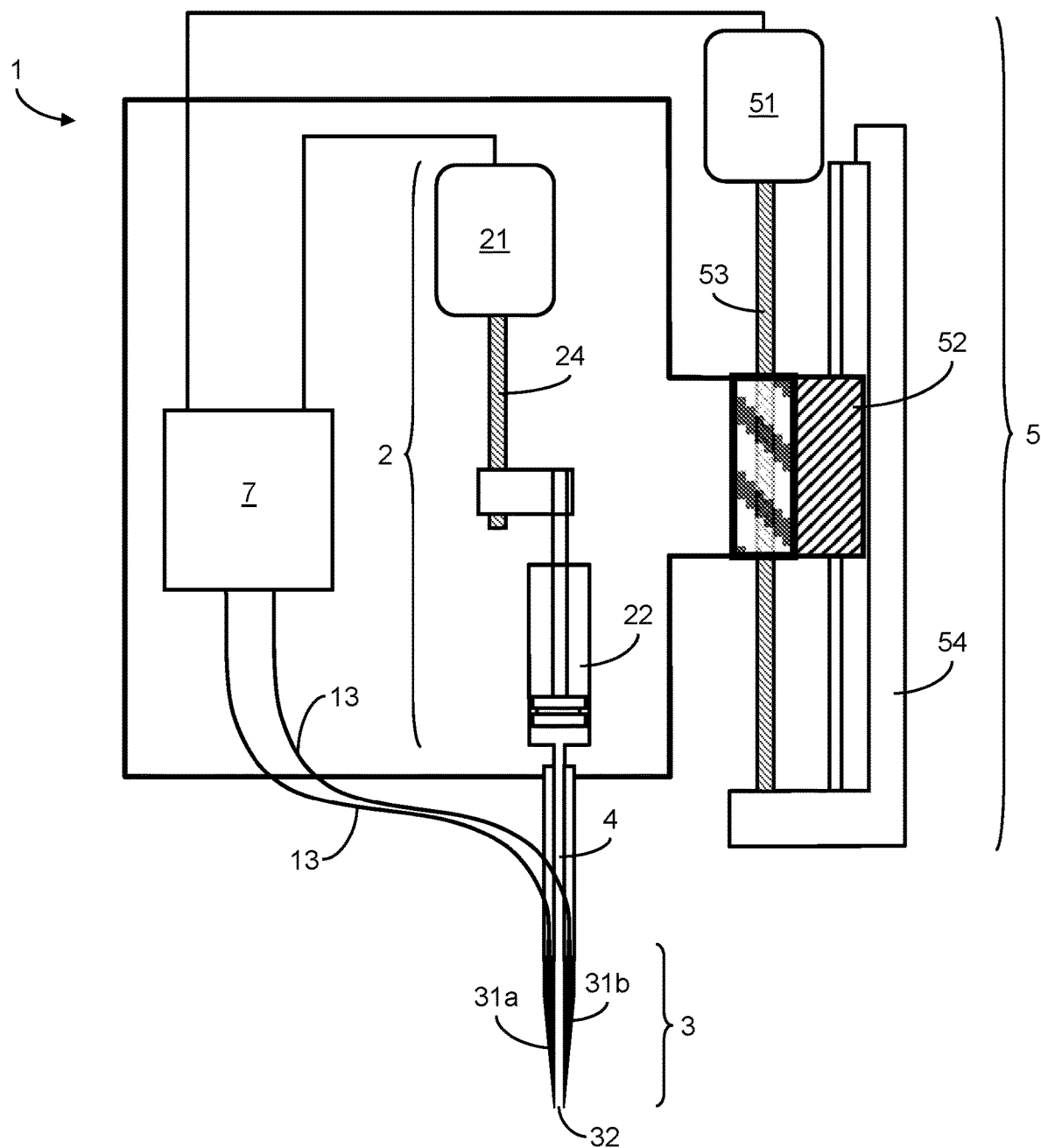
Figure 4B:
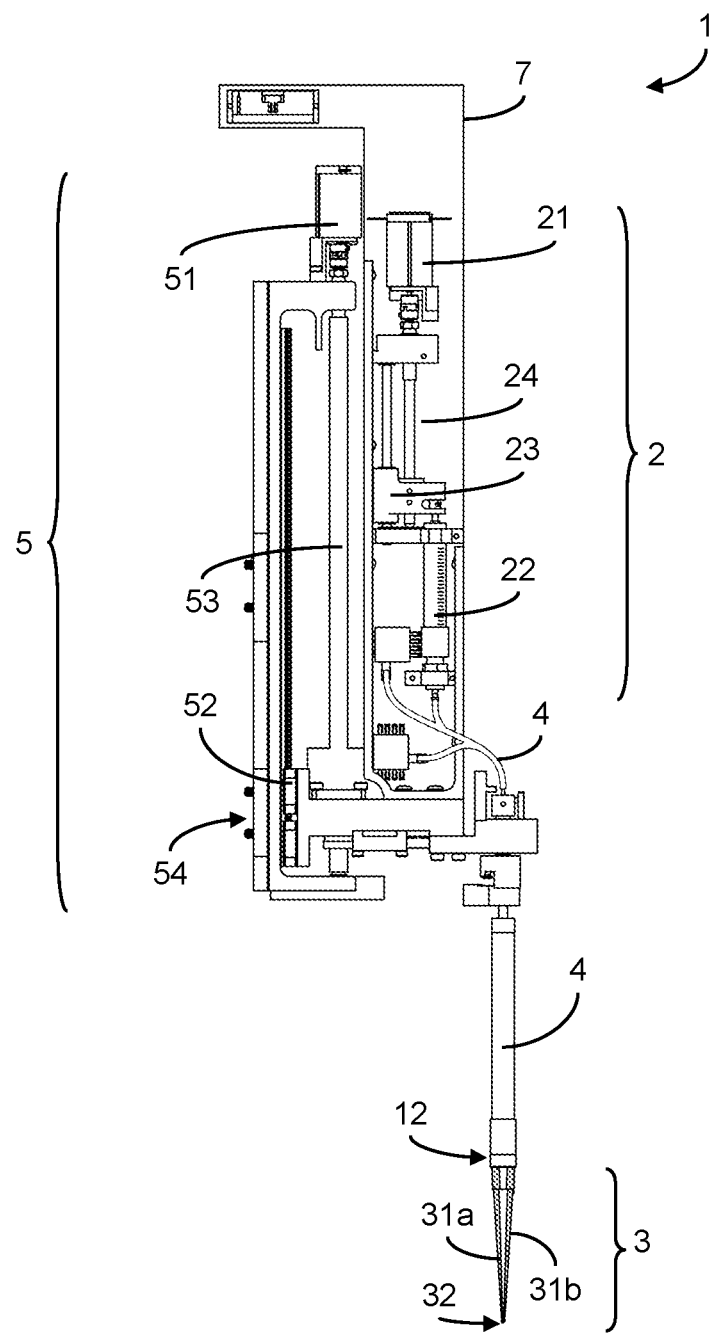
Figure 5A:
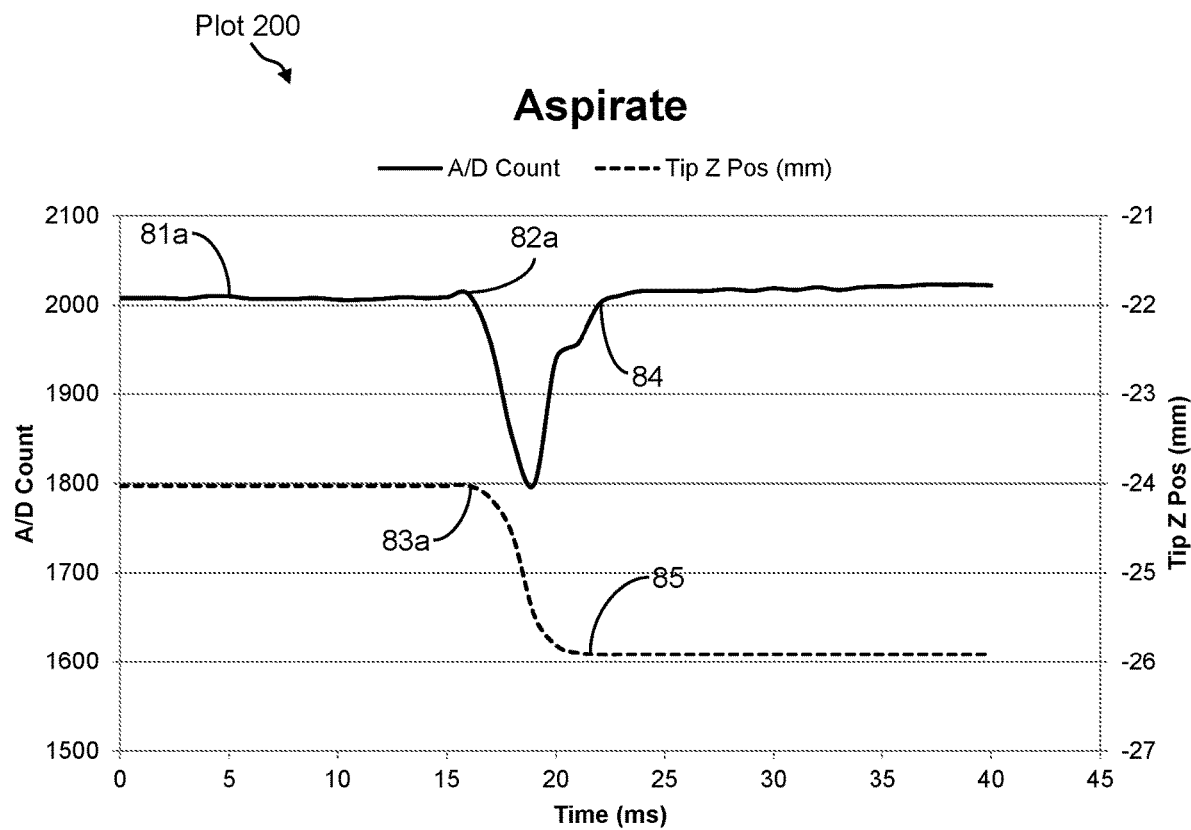
Figure 5B:
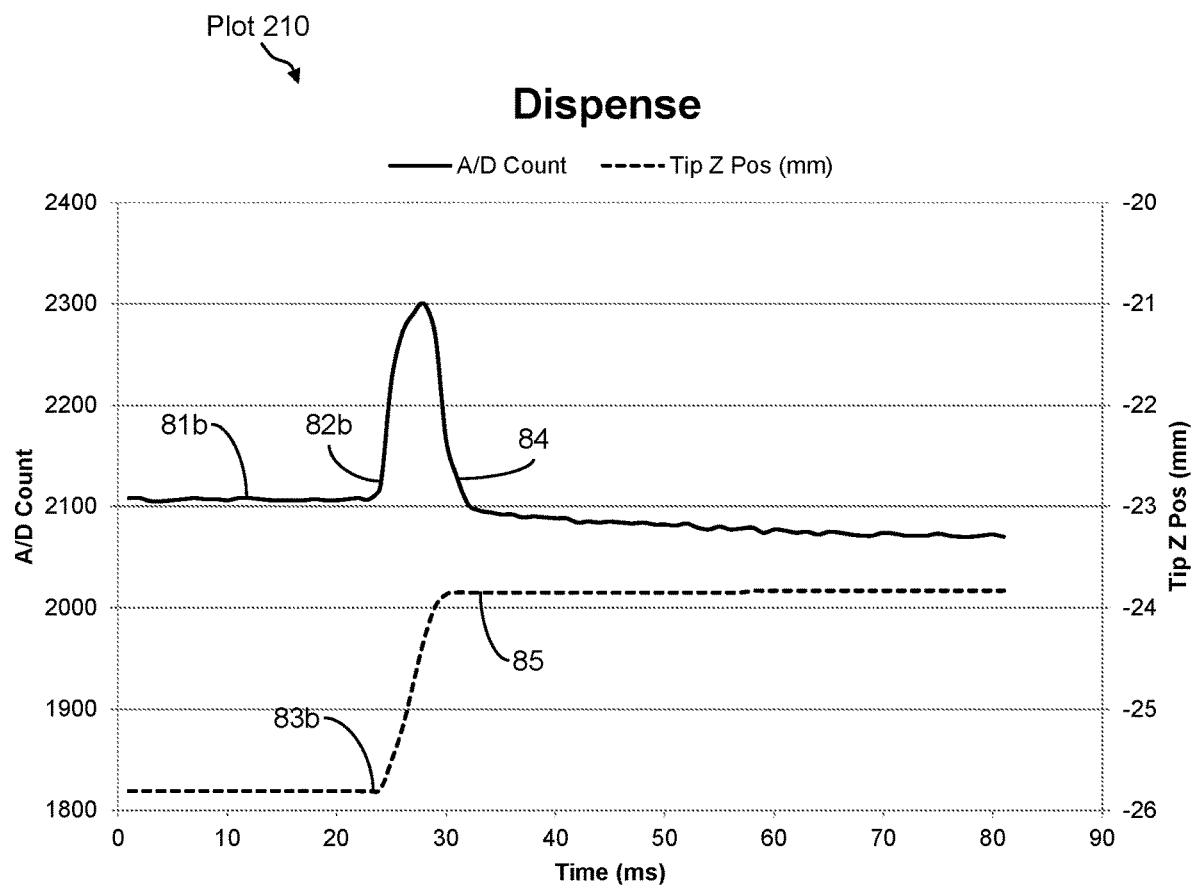
Figure 6A:
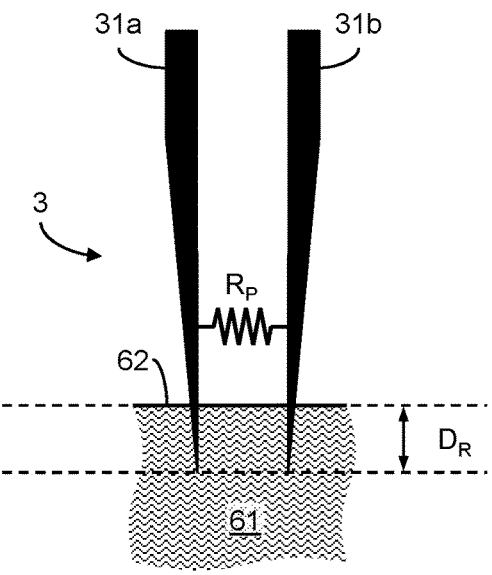
Figure 6B:
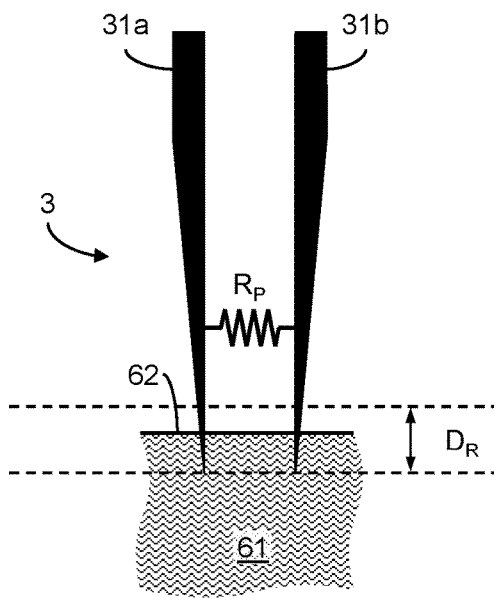
Figure 6C:
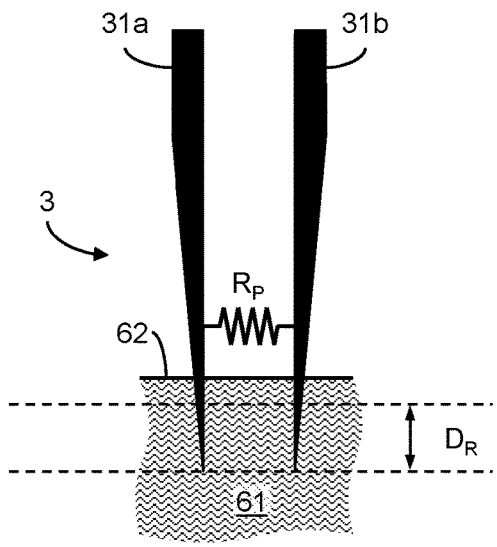
Figure 7:
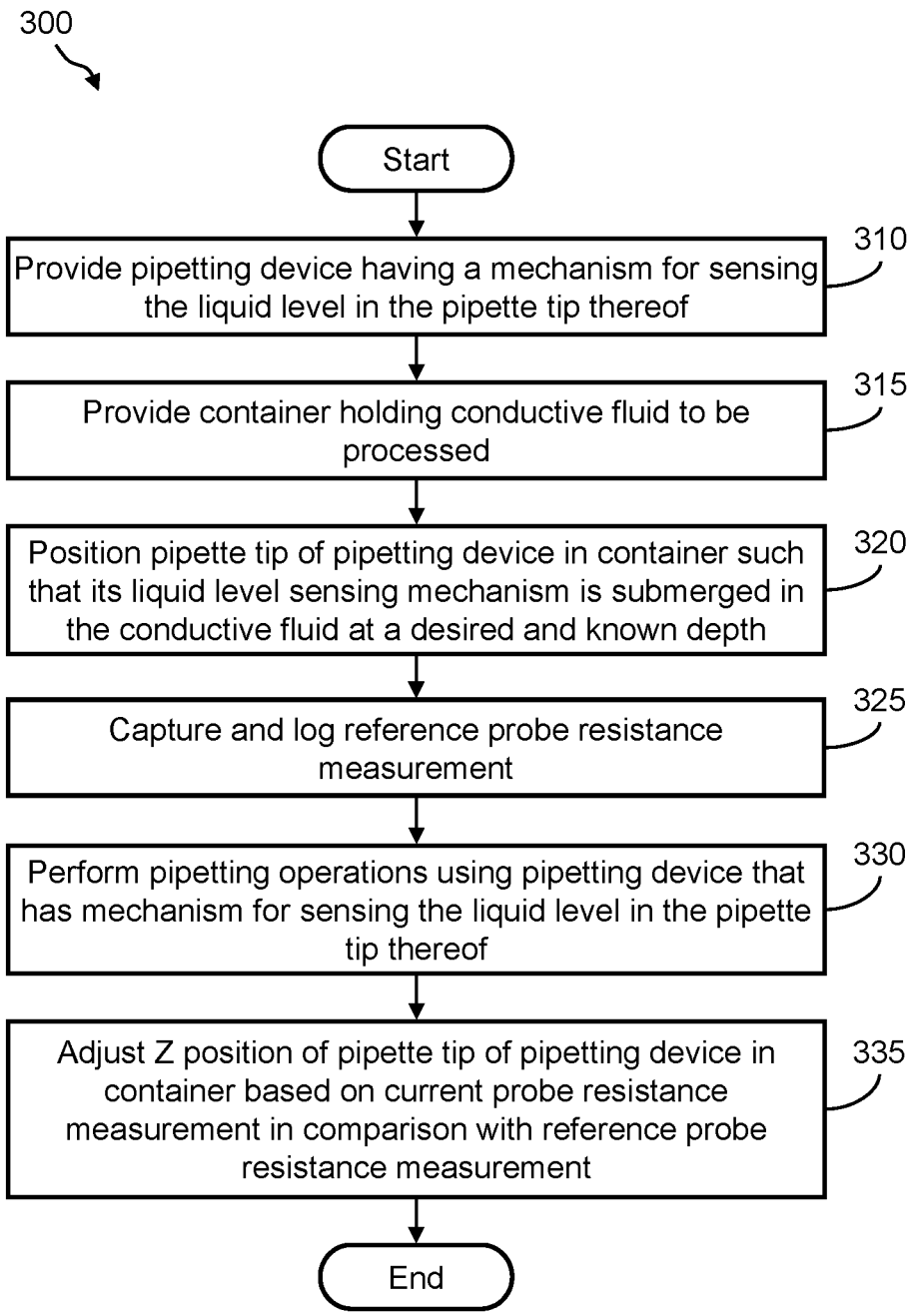

Having thus described the disclosed subject matter in general terms, reference will now be made to the accompanying Drawings, which are not necessarily drawn to scale, and wherein:

FIG. 1 illustrates a cross-sectional side view of a liquid handling apparatus according to an exemplary embodiment of the presently disclosed subject matter;

FIG. 2A, FIG. 2B, and FIG. 2C illustrate a side view, a perspective view, and a cross-sectional view, respectively, of a pipette tip according to an exemplary embodiment of the presently disclosed subject matter;

FIG. 3A illustrates a cross-sectional view of a pipette tip attached to a liquid handling apparatus according to an exemplary embodiment of the presently disclosed subject matter;

FIG. 3B illustrates an exploded side view of a pipette tip for attaching to a liquid handling apparatus according to an exemplary embodiment of the presently disclosed subject matter;

FIG. 4A illustrates a schematic diagram of the liquid handling apparatus of FIG. 1 with a pipette tip attached thereto according to an exemplary embodiment of the presently disclosed subject matter;

FIG. 4B illustrates a side view of the liquid handling apparatus of FIG. 1 with a pipette tip attached thereto according to an exemplary embodiment of the present subject matter;

FIG. 5A shows a plot of a measured signal and system response during aspiration of a sample using the device according to an exemplary embodiment of the present subject matter;

FIG. 5B shows a plot of a measured signal and system response during dispensation of a sample using the device according to an exemplary embodiment of the present subject matter;

FIG. 6A, FIG. 6B, and FIG. 6C illustrate side views of an exemplary pipette tip at different levels, heights, or depths with respect to the level of liquid;

FIG. 7 illustrates a flow diagram of an example of a method of using the liquid handling apparatus of FIG. 1 to adjust automatically the depth of the pipette tip in a liquid in response to a changing probe resistance measurement;

FIG. 8A, FIG. 8B, FIG. 8C, FIG. 8D, and FIG. 8E illustrate various views of a 20 µL-pipette tip according to another exemplary embodiment of the presently disclosed subject matter;

FIG. 9A, FIG. 9B, FIG. 9C, FIG. 9D, and FIG. 9E illustrate various views of a 20 µL-pipette tip according to yet another exemplary embodiment of the presently disclosed subject matter;

FIG. 10A, FIG. 10B, FIG. 10C, FIG. 10D, and FIG. 10E illustrate various views of a 200 µL-pipette tip according to yet another exemplary embodiment of the presently disclosed subject matter;

FIG. 11A, FIG. 11B, FIG. 11C, FIG. 11D, and FIG. 11E illustrate various views of a 200 µL-pipette tip according to yet another exemplary embodiment of the presently disclosed subject matter; and FIG. 12A, FIG. 12B, FIG. 12C, FIG. 12D, and FIG. 12E illustrate various views of a pipette tip according to still another exemplary embodiment of the presently disclosed subject matter.

DETAILED DESCRIPTION

The following subject matter now will be described more fully hereinafter with reference to the accompanying Drawings, in which some, but not all embodiments of the disclosed subject matter are shown. Like numbers refer to like elements throughout. The disclosed subject matter may be embodied in many different forms and should not be construed as limited to the embodiments set forth herein; rather, these embodiments are provided so that this disclosure will satisfy applicable legal requirements. Indeed, many modifications and other embodiments of the disclosed subject matter set forth herein will come to mind to one skilled in the art to which the disclosed subject matter pertains having the benefit of the teachings presented in the foregoing descriptions and the associated Drawings Therefore, it is to be understood that the disclosed subject matter is not to be limited to the specific embodiments disclosed and that modifications and other embodiments are intended to be included within the scope of the appended claims.

In some embodiments, the disclosed subject matter provides a pipette tip for and method of automatically maintaining pipette tip depth in a fluid during a fluid transfer operation. The pipette tip and methods described herein can provide automatic tracking of a liquid level in real time during a pipetting operation without prior knowledge of the container geometry. Namely, the presently disclosed pipette tip and method can reduce or eliminate the need for prior knowledge and characterization of labware containers for the purpose of predicting changes in the height of a liquid surface during a pipetting operation.

The present disclosure provides a method of maintaining a depth of a pipette tip in a liquid throughout a pipetting operation, as the liquid surface rises or falls in its container, without any prior knowledge of the container geometry. For instance, in a laboratory setting, a user with no knowledge of, or experience programming a liquid handler for use with particular labware containers, can easily work with an automated liquid handler on which a pipette tip and method disclosed herein have been implemented. The user may benefit from improved ease of use accompanied by improved precision and accuracy of transferred volumes resulting from the consistent and reliable depth of a pipette tip throughout a series of liquid handling operations.

In some embodiments, a pipette tip and method described herein have a sensing mechanism in the pipette tip to track the surface of a liquid with respect to the pipette tip during a pipetting operation on an automated liquid handling instrument. Namely, a pipette tip described herein comprises a pair of electrodes positioned along a length of the pipette tip. The pair of electrodes can provide electrical feedback (e.g., an electrical resistance measurement between electrodes) that can be correlated to a depth of the pipette tip in a conductive fluid. That is, a resistance value between the pipette tip electrodes will change proportionally with the depth of the pipette tip in the fluid.

In some embodiments, a pipette tip and method described herein can improve ease of use of automated liquid handling instruments while maintaining or improving the reliability of pipetting results.

In some embodiments, a pipette tip and method described herein can improve a user experience of automated liquid handling instruments by automating some aspects of pipetting operations that may otherwise necessitate manual programming of the instrument by the user. In particular, the pipette tip and method can remove or reduce a need to define and specify a geometry of labware containers by providing a method of automatically tracking the liquid level in real time during a pipetting operation. Further, a pipette tip and method described herein can in many instances eliminate a need for prior knowledge and characterization of labware containers for the purpose of predicting changes in the height of the liquid surface as liquid is added or removed from a container.

In some embodiments, a pipette tip and method described herein provides a pipette tip that is substantially transparent, whereby the user may directly observe any liquid inside the pipette tip during a pipetting operation.

Referring now to FIG. 1 is a side view of an example of a liquid handling apparatus 1 for utilizing a pipette tip and method described herein. Namely, liquid handling apparatus 1 is a mechanized liquid handling device. Liquid handling apparatus 1 comprises a pump 2 in fluidic communication with a nozzle 3 via an enclosed air volume 4. In some embodiments, the enclosed volume can be filled with a system fluid. The nozzle 3 has an opening 32 through which liquids are taken up into or ejected out of the nozzle 3. Further, in some embodiments, the liquid handling apparatus 1 can be fixed to a vertically oriented linear actuator 5 which can control the height of the nozzle 3 relative to a fixed frame 54 of the apparatus 1 and relative to a container 6 fixed in height relative to the fixed frame 54. However, in other instances, the linear actuator 5 can be fixed in other orientations, such as obliquely or diagonally to the fixed frame 54.

The container 6 holds a quantity of liquid 61. The linear actuator 5 can be used to adjust the height of the liquid handling apparatus 1 in order to insert the nozzle 3 into the liquid 61 so that it can aspirate or dispense the liquid 61.

As liquid 61 is removed from or added to the container 6 via the nozzle 3, the surface of the liquid (i.e., liquid surface 62) in the container 6 will fall or rise, respectively. The height of the liquid handling apparatus 1 must be adjusted in order to keep the opening of the nozzle 3 submerged in the liquid 61 at a consistent depth as the liquid level changes to avoid transfer volume errors caused by aspirating air. Preferably, the height of the liquid handling apparatus 1 is controlled such that the opening of the nozzle 3 remains at a consistent depth below the liquid surface 62 as the liquid level changes for maximum precision and accuracy of delivered volumes.

In an automated pipetting application, the nozzle 3 can be referred to as a pipette tip. Accordingly, the nozzle 3 is hereafter called the pipette tip 3. In one embodiment of the presently disclosed method, electrical signal feedback from the pipette tip 3 can be used to sense the depth of the pipette tip 3 in the liquid 61. This signal feedback can serve as input to a control loop driving the vertical linear actuator 5 to maintain a constant depth of the pipette tip 3 in the liquid 61, even as the liquid level rises and falls in the container 6.

The method disclosed herein can make use of the electrical resistivity of conductors in the pipette tip 3. In one such exemplary embodiment, the pipette tip 3 can include pipette tip electrodes 31a, 31b to provide this electrical input. Electrical resistivity is an intrinsic material property that describes the degree to which a material opposes the flow of electric current. The total electrical resistance of a body of material is related to its resistivity and geometry, as calculated by:

$$R = \rho \cdot \frac{l}{A}$$

Where:
  R is the resistance (ohms)
  ρ is the resistivity (ohm-metre)
  l is the length of the body between points of electrical contact (meter)
  A is the cross-sectional area of the body (meter square)

Thus, it can be understood that by changing the length of a body through which electric current flows, the measured resistance of the body will change proportionally.

FIG. 2A, FIG. 2B, and FIG. 2C is a side view, a perspective view, and a cross-sectional view, respectively, of one embodiment of a pipette tip 3 that includes a liquid level sensing mechanism. Conductive electrodes (e.g., pipette tip electrodes 31a, 31b) with measurable resistance can be provided in a liquid handling pipette tip 3. Namely, two separate pipette tip electrodes 31a, 31b are included on the pipette tip 3 to measure a resistance in the disclosed method. In some embodiments, the two pipette tip electrodes 31a, 31b extend a full longitudinal length of the pipette tip 3 from a securing end 33 to a fluid transferring end 34. For orientation purposes, the fluid transferring end 34 comprises opening 32 of the pipette tip 3, where liquids are aspirated into, and dispensed from, the pipette tip 3. The securing end 33 is located opposite to the fluid transferring end (i.e. distal to the opening 32), and is the portion of the pipette tip 3 that interacts with, and/or secures the pipette tip 3 to a liquid handling apparatus 1. In some embodiments, the two pipette tip electrodes 31a, 31b do not extend the full longitudinal length of the pipette tip 3, but instead can terminate below the securing end 33 of the pipette tip 3. Thus, in some instances one or both of the pipette tip electrodes 31a, 31b have a length that is less than the full longitudinal length of the pipette tip 3. Preferably, the two pipette tip electrodes 31a, 31b should terminate near the securing end 33 of the pipette tip 3 where an electrical connection to the liquid handling apparatus 1 will be made. The design of such an electrical connection can vary. In some embodiments, the two pipette tip electrodes 31a, 31b can terminate above the fluid transferring end 34 of the pipette tip 3. However, it should be understood that no liquid level tracking is possible below a point on the pipette tip 3 to which both pipette tip electrodes 31a, 31b extend. In order to comply with general practice ensuring best fluid transfer results, only a very small length of the pipette tip 3 is submerged in a fluid (e.g., liquid 61). Thus, the two pipette tip electrodes 31a, 31b preferably extend to or nearly to the fluid transferring end 34 of the pipette tip 3 to allow for liquid level tracking.

In some embodiments, pipette tip electrodes 31a, 31b are fully separated from one another by electrically insulating material 37. Further, both pipette tip electrodes 31a, 31b are exposed to a pipette tip outer surface 36 to allow sensation of the liquid level outside the pipette tip 3, and neither conductor is exposed to a pipette tip inner surface 35 to prevent sensation of the liquid level inside the pipette tip 3.

However, the design of the pipette tip 3 is not limited only to electrodes on the outer surface thereof. Instead, the electrodes can be positioned on any surface of the pipette tip 3 not inconsistent with the objectives of this disclosure. For example, in some embodiments, the pipette tip electrodes 31a, 31b can be provided on the pipette tip inner surface 35 to allow sensation of the liquid level inside the pipette tip 3. Namely, to measure a liquid level inside a calibrated pipette tip 3 and therefore measure the volume of a calibrated conductive liquid. In yet other embodiments, the design of the pipette tip 3 includes electrodes on both the outer surface and the inner surface of the tip. Accordingly, such a design allows sensation of the liquid level both outside and inside the pipette tip 3.

In some embodiments, a pipette tip 3 described herein is disposable to avoid contamination from one process to another. In some instances, the pipette tip 3 is resistant to a wide range of chemicals. For example, in some cases the pipette tip 3 is an injection molded product composed of polypropylene. Since polypropylene is an excellent electrical insulator, this material can also serve as an appropriate insulating material to separate the two pipette tip electrodes 31a, 31b. However, the invention is not limited to pipette tips 3 made solely from polypropylene, but, rather, any material not inconsistent with the objectives of this disclosure can also be used. For example, in some embodiments, pipette tips 3 described herein can be made from polyethylene, polybutylene, or other polyolefins. The following methods will be described in the context of polypropylene as a building material for the pipette tip 3 for purposes of simplicity and readability, but the invention should not be interpreted as excluding other suitable materials.

One method of making a pipette tip with two conductive electrodes is dual shot injection molding, comprising a first shot of transparent insulating polypropylene material to form the body and inner cone of the pipette tip 3, and a second shot of electrically conductive polypropylene to form the two separate conductive pipette tip electrodes 31a, 31b. The result is a single part or unit composed of two different materials. Polypropylene is an excellent electrical insulator, and so is an appropriate insulating material for the first shot to form the body of the pipette tip 3 and separate the two pipette tip electrodes 31a, 31b. Polypropylene can be made to be electrically conductive through the addition of a variety of conductive additives, such as conductive carbon black or various inorganic conductors known to those in the art. Accordingly, polypropylene is an appropriate material for the second shot to form the two separate conductive pipette tip electrodes 31a, 31b.

Another method of making a pipette tip with two conductive electrodes as described above is to selectively coat the outside of a pipette tip with a conductive material. This could involve printing a conductive ink or applying a conductive resin, among other techniques. In a preferred embodiment, the body of the pipette tip 3 is composed of electrically insulating polypropylene and is produced by an injection molding process. Conductive electrodes are applied to the pipette tip in a secondary process, in which conductive polypropylene is printed onto the outside of the pipette tip to form thin conductive strips. One advantage of such a method is that the conductive strips can cover a very small area of the outside of the pipette tip, leaving much of the pipette tip transparent to an observer. In some instances, transparency can be a desirable feature of the pipette tip for the user of a liquid handling device because it allows the user to directly observe any liquid inside the pipette tip during a pipetting operation. Conventional conductive pipette tips are fully opaque and the liquid inside of the pipette tip cannot be observed.

Examples of the material for forming the conductive pipette tip electrodes 31a, 31b of the pipette tip 3 can include, but are not limited to, electrically conductive polypropylene resin, electrically conductive epoxy, electrically conductive ink, copper, and the like. Further, the conductive material used to form the conductive pipette tip electrodes 31a, 31b has an appropriate resistivity such that, given the length and cross section of the electrode body, the total resistance can be measured with reasonable resolution. For example, conductors composed of copper metal wires applied to the pipette tip outer surface 36 can have an inconsequential resistivity to allow measurable changes in resistance over the length of a pipette tip 3 without highly specialized equipment. A typical total resistance measurement of a pipette tip that can hold 200 µl of liquid and has electrodes composed of conductive polypropylene resin and with the fluid transferring end 34 submerged about 2 millimeters into tap water can be on the order of from about 50 kiloohm to about 200 kiloohm. The allowable range of resistance is much greater.

Referring now to FIG. 3A is a block diagram showing the attachment of a pipette tip 3 described herein to a liquid handling apparatus 1. Additionally, FIG. 3B shows a side view of a specific example of the pipette tip 3 adapted for attachment to a liquid handling apparatus 1. In an embodiment shown in FIGS. 3A and 3B, a pipette tip attachment point 12 of liquid handling apparatus 1 includes a pair of electrical contact points 11a, 11b to conduct electrical signals between the pair of pipette tip electrodes 31a, 31b, respectively, and wires 13 leading to an electronic controller 7. During pipette tip 3 attachment, each of two electrical contact points 11a, 11b comes into good electrical connection with its corresponding pipette tip electrode 31 on the pipette tip 3, so that both pipette tip electrodes 31a, 31b on the pipette tip 3 are connected to the electronic controller 7 by the electrical contact points 11a, 11b. Specifically, electrical contact point 11a is connected to pipette tip electrode 31a and electrical contact point 11b is connected to pipette tip electrode 31b. The electrical contact points 11a, 11b can be spring loaded to ensure a reliable electrical connection is made to the pipette tip electrodes 31a, 31b each time a pipette tip 3 is attached to the liquid handling apparatus 1. In some embodiments, a mechanism or method is implemented to ensure the pipette tip 3 is reliably attached to the liquid handling apparatus 1 in an appropriate orientation such that the electrical contact points 11a, 11b are in good electrical connection to the pipette tip electrodes 31a, 31b. Further, the pipette tip 3 attaches to the liquid handling apparatus 1 by a mechanism that ensures reliable pneumatic sealing to a conduit leading to a pump 2 to ensure proper pipette performance. As previously described herein, the pipette tip 3 attaches to the liquid handling apparatus 1 at the securing end 33. The design and direction of such mechanisms and methods can vary and their specific features fall outside the scope of the present disclosure.

With no pipette tip 3 attached to the liquid handling apparatus 1, the circuit between the two electrical contact points 11a, 11b on the liquid handling apparatus 1 is open and no current can flow. That is, the measured resistance is extremely high. With an appropriate pipette tip 3 properly attached to the liquid handling apparatus 1, the circuit between the two electrical contact points 11a, 11b will still be open, however a slight change in signal can be detected between the two conductors, and thus the presence of a properly attached pipette tip 3 can be confirmed before proceeding with a pipetting operation.

During a pipetting operation, if the pipette tip 3 is submerged in a conductive fluid, the pipette tip electrodes 31a, 31b provided in the pipette tip 3 will be electrically connected via the conductive fluid. If such a connection is made, it will be a probe-liquid closed circuit between the electronic controller 7, the electrical contact points 11a, 11b at the pipette tip attachment point 12, the pipette tip electrodes 31a, 31b, and the conductive fluid 61, causing a significant change in signal measured by the electronic controller 7. If the depth of the pipette tip 3 in the liquid changes, the point along the length of the pipette tip 3 at which the conductive fluid is connecting the two pipette tip electrodes 31a, 31b will change, and therefore the effective length of the pipette tip electrodes 31a, 31b in the circuit will change. Thus, the resistance of pipette tip electrodes 31a, 31b in the circuit will change proportionally with the depth of the pipette tip 3 in the fluid (e.g., liquid 61).

A particular depth can be maintained if a reference resistance value is taken at that particular depth. Continuous resistance measurements can be used as input to a control loop driving the vertical linear actuator 5 tuned to maintain the reference resistance value at a set point. If the liquid level rises or falls on the pipette tip, the resistance measurement will fall or rise, respectively, and the height of the pipette tip 3 can be adjusted to maintain that resistance value, and therefore maintain the depth of the pipette tip 3 as the liquid level changes.

Resistance measurement of the probe-liquid circuit can be performed in a variety of ways, as one familiar with the art will understand. In some embodiments, the unknown resistance of the pipette tip circuit can be measured with reference to a known input voltage and a known resistance by way of a voltage divider circuit and an analog-to-digital signal processing unit.

The input signal to be measured can be generated in the form of direct current or alternating current. In some embodiments, an alternating current signal is used to improve the performance of the system. In some embodiments that make use of a direct current signal, the conductivity of a pipette tip electrode 31 submerged in conductive liquid can deteriorate over a certain period of time in ionic liquids. The use of alternating current has been found to prevent this fouling of the pipette tip electrodes.

In some embodiments, an alternating current voltage signal can be simply interpreted as a direct current voltage by taking the root mean square of the alternating current voltage signal before conventional analog-to-digital signal processing. In a preferred embodiment, the alternating current signal is interpreted by way of lock-in amplification. Such a method is capable of extracting a signal with a known reference frequency even from very noisy input. Such a method is effective at isolating the desired signal even in the midst of interference from adjacent apparatuses performing similar or different functions. The resulting direct current signal can be processed by a typical analog to digital conversion.

The method described herein is only compatible with conductive liquids that allow current to flow between the pipette tip electrodes 31a, 31b. For non-conductive fluids, conventional liquid level tracking is required, meaning the labware geometry must be programmed in advance to predict liquid level movements during a pipetting operation. However, the method described herein can be implemented as a fast and convenient way of calibrating the geometry of labware containers to be used in a pipetting operation with non-conductive fluids. The calibration method would involve measuring the container geometry by liquid level detection and tracking with a conductive fluid. Such a calibration method would be free of cumbersome measurements to determine container geometry. The calibrated geometry can be useful for performing liquid level tracking with non-conductive liquids as well as with conventional pipette tips lacking the dual electrode features described herein.

An example of the disclosed method of automatically tracking the surface of a liquid during a pipetting operation with a pipette tip, such as the pipette tip 3 as described hereinabove with reference to FIG. 1 through FIG. 3B, will now be described in detail with reference to FIG. 4A and FIG. 4B.

Referring now to FIG. 4A, a block diagram is shown of the liquid handling apparatus 1 of FIG. 1 with a pipette tip 3 attached thereto. Additionally, FIG. 4B shows a side view of a specific example of one instantiation of the liquid handling apparatus 1 of FIG. 1 with a pipette tip 3 attached thereto.

As illustrated, a liquid handling apparatus 1 described herein includes, but is not limited to, a pump 2, a pipette tip 3 as described above (in FIG. 1 through FIG. 3B) in airtight connection to a conduit leading to the pump 2, an electronic controller 7 governing the apparatus 1 in electrical connection with the pipette tip electrodes 31a, 31b, and a vertical linear actuator 5, which can move the apparatus 1 vertically. The pump 2 can be any mechanism that provides positive or negative pressure. In one example, the pump 2 can be a syringe pump, wherein the syringe pump 2 can include, but is not limited to, a motor 21, a syringe 22, a linear motion guide 23, and a lead screw 24, as shown in FIG. 4A and FIG. 4B. The vertical linear actuator 5 can include, but is not limited to, a motor 51, a linear motion guide 52, a lead screw 53, and an attachment to the fixed frame 54 of the apparatus 1, as shown in FIG. 4A and FIG. 4B. The electronic controller 7 can be a microcontroller capable of, but not limited to, generating and receiving signals, processing the signals, sending motion commands, and processing data in order to perform the electronic functions described herein as well as other features.

In some embodiments, a method described herein begins with the electronic controller 7 measuring a resistance between electrical contact points 11a, 11b at the pipette tip attachment point 12 to identify whether an appropriate pipette tip 3 has been correctly connected to the system. If an appropriate pipette tip 3 has been correctly connected, the method can continue.

In some embodiments, a method described herein proceeds by lowering the pipette tip 3 to the liquid surface 62 (shown in FIG. 1) using any automated method known in the art. For example, the pipette tip 3 is lowered into the liquid to a desired depth. The desired depth is typically a depth sufficient to ensure that air will not be aspirated. For example, the end of the pipette tip 3 can be from about 1 mm to about 2 mm below the liquid surface 62. The electrical controller 7 then measures the resistance of the pipette tip 3 to determine a reference resistance value to be used as a set point in the vertical position control loop. If the liquid 61 is found to be non-conductive, the automatic tracking method is cancelled and the geometry of the container 6 must be programmed into the instrument to ensure proper tracking.

In some embodiments, the depth of the pipette tip 3 in the liquid 61 is maintained by a vertical position control loop that uses the resistance measurement as input. A typical resistance signal and associated vertical actuator response during an aspiration is shown in a plot 200 of FIG. 5A. The control loop drives the vertical linear actuator 5 to maintain a reference resistance set point 81a of the pipette tip 3 shown in plot 200. If the liquid level in the container falls, the liquid level on the pipette tip 3 also falls and the resistance measurement increases. In some instances, an increase in resistance at the pipette tip 3 is interpreted as a reduction in the A/D count measured by the electronic controller 7. If the resistance measurement increases beyond a threshold 82a shown in plot 200, meaning the A/D count drops below threshold 82a, the electronic controller 7 will respond by commanding the vertical linear actuator 5 to drive the pipette tip 3 downward to a Z position at a threshold level 83a so as to track the liquid level and attempt to maintain the reference resistance set point 81a. The height of the liquid 61 in the container 6 will only change as long as the pump 2 is aspirating liquid into the pipette tip 3. As the aspiration nears completion, the liquid level on the pipette tip 3 will become stable and return to the set point 84 shown in plot 200, causing the pipette tip to become stable at a Z position corresponding with a new liquid level 85 shown in plot 200.

A typical resistance signal and associated vertical actuator response 5 during a dispensation is shown in a plot 210 of FIG. 5B. After a reference resistance set point 81b has been established, if the liquid level in the container rises, the liquid level on the pipette tip rises and the resistance measurement decreases. A decrease in resistance causes an increase in the A/D count measured by the electronic controller 7. If the A/D signal exceeds a threshold level 82b, the electronic controller 7 responds by commanding the vertical linear actuator 5 to drive the pipette tip 3 upward to a Z position at a threshold level 83b so as to track the liquid level in an attempt to maintain the reference resistance set point 81b.

Those familiar in the art will understand a variety of control loop techniques can be applied. For example, the control loop can be controlled in a proportional manner, meaning a small slow change in resistance signal will result in a small gradual change in Z position, and a large fast change in resistance will result in a fast change in Z position.

Further to the example, FIG. 6A, FIG. 6B, and FIG. 6C show side views of an example of the pipette tip 3 at different levels, heights, or depths with respect to the level of liquid 61 (i.e., liquid surface 62). Namely, FIG. 6A shows the pipette tip 3 at a reference depth $D_R$, which is, for example, the desired depth to which the pipette tip 3 is to be maintained during the pipetting process. The pipette tip 3 has a probe resistance value $R_P$. When at the reference depth $D_R$ the pipette tip 3 has a certain probe resistance value $R_P$ that can be measured and logged as the reference probe resistance value $R_P$. Then, as the level of liquid 61 changes and the measured probe resistance value $R_P$ changes, the Z position of the pipette tip 3 can be adjusted up or down until the reference depth $D_R$ and the reference probe resistance value $R_P$ are found. For example, FIG. 6B shows the pipette tip 3 at a depth that is less than the reference depth $D_R$, Accordingly, the probe resistance value $R_P$ is greater than the reference probe resistance value $R_P$, which prompts the electronic controller 7 to adjust the Z position of the pipette tip 3 downward until the reference depth $D_R$ is reached. Similarly, FIG. 6C shows the pipette tip 3 at a depth that is greater than the reference depth $D_R$, Accordingly, the probe resistance value $R_P$ is less than the reference probe resistance value $R_P$, which prompts the electronic controller 7 to adjust the Z position of the pipette tip 3 upward until the reference depth $D_R$ is reached.

FIG. 7 shows a flow diagram of an example of a method 300 of using a liquid handling apparatus described herein to adjust automatically a depth of a pipette tip in a liquid in response to a changing probe resistance measurement. Accordingly, method 300 can be used to automatically maintain the depth of the pipette tip 3 in a liquid throughout a pipetting operation, as the liquid surface rises or falls in its container, and with or without any prior knowledge of the container geometry. The method 300 can include, but is not limited to, the following steps.

At a step 310, a pipetting device is provided that has a mechanism for sensing the liquid level in the pipette tip thereof. For example, the liquid handling apparatus 1 and a pipette tip 3 described herein are provided, wherein the pipette tip 3 includes two pipette tip electrodes 31a, 31b along the length of the pipette tip 3. The two pipette tip electrodes 31a, 31b provide electrical feedback (e.g., an electrical resistance measurement between electrodes), such as a probe resistance value $R_P$ (see FIG. 6A, FIG. 6B, FIG. 6C) that can be correlated to a depth of the pipette tip in a conductive fluid. That is, the resistance of the pipette tip electrodes will change proportionally with the depth of the pipette tip in the liquid.

At a step 315, a container is provided that holds a conductive fluid to be processed. For example, in the liquid handling apparatus 1, the container 6 is provided that holds a quantity of liquid 61.

At a step 320, the pipette tip of the pipetting device is positioned in the container such that its liquid level sensing mechanism is submerged in the conductive fluid at a desired and known depth. For example and referring now to FIG. 6A, the pipette tip 3 of the liquid handling apparatus 1 is positioned in the container 6 such that the pipette tip 3 is submerged in the conductive fluid 61 at a desired and known depth, such as at the reference depth $D_R$.

At a step 325, the reference probe resistance measurement is captured and logged. For example and referring now to FIG. 6A, using the electronic controller 7, the reference probe resistance value $R_P$ is measured and logged.

At a step 330, pipetting operations are performed using the pipetting device that has the mechanism for sensing the liquid level in the pipette tip thereof. For example, pipetting operations are performed using the pipette tip 3 of the liquid handling apparatus 1. In so doing, the liquid level in the container can rise or fall with respect to the Z position of the pipette tip 3 in the conductive fluid 61. Further, in this step the electronic controller 7 continuously monitors the probe resistance value $R_P$ (see FIG. 6A, FIG. 6B, FIG. 6C) of the pipette tip 3.

At a step 335, the position of the pipette tip of the pipetting device in the container is adjusted based on the current probe resistance measurement in comparison with the reference probe resistance measurement. In one example and referring now to FIG. 6B, if the liquid level has fallen with respect to the pipette tip 3, then the current probe resistance value $R_P$ increases. In response to the increasing probe resistance value $R_P$, the electronic controller 7 adjusts the Z position of the pipette tip 3 downward until the reference probe resistance value $R_P$ is reached because the reference depth $D_R$ is reached. In another example and referring now to FIG. 6C, if the liquid level has risen with respect to the pipette tip 3, then the current probe resistance value $R_P$ decreases. In response to the decreasing probe resistance value $R_P$, the electronic controller 7 adjusts the Z position of the pipette tip 3 upward until the reference probe resistance value $R_P$ is reached because the reference depth $D_R$ is reached.

Further and referring now to FIG. 1 through FIG. 7, while multiple conductive bodies within a pipette tip can be known and measurement of resistance between those bodies to determine some state of the nozzle relative to the liquid can be known, a pipette tip and method described herein can provide a mechanism for measuring resistance as an analog input to a position control loop to maintain a certain predetermined depth of the nozzle (i.e., the pipette tip 3) in the liquid. By contrast, conventional methods are limited in that any resistance measurement between two conductive bodies in a nozzle is taken as an on/off digital measurement to determine one of two states.

Further and referring now to FIG. 1 through FIG. 7, a pipette tip and method described herein can provide certain beneficial features that are not present in conventional liquid handling systems. For example, certain features of the conductive bodies can include, but are not limited to, two conductive bodies on the outer surface of the pipette tip, both extending substantially the full length of the pipette tip. Namely, the two conductive bodies can extend from the top (securing end), where the tip is electrically and pneumatically connected to the apparatus, to the bottom (fluid transferring end), where the tip is submerged in a fluid. Similarly, certain features of the conductive bodies can include, but are not limited to, two conductive bodies on the inner surface of the pipette tip, both extending substantially the full length of the pipette tip.

Figure 8A:
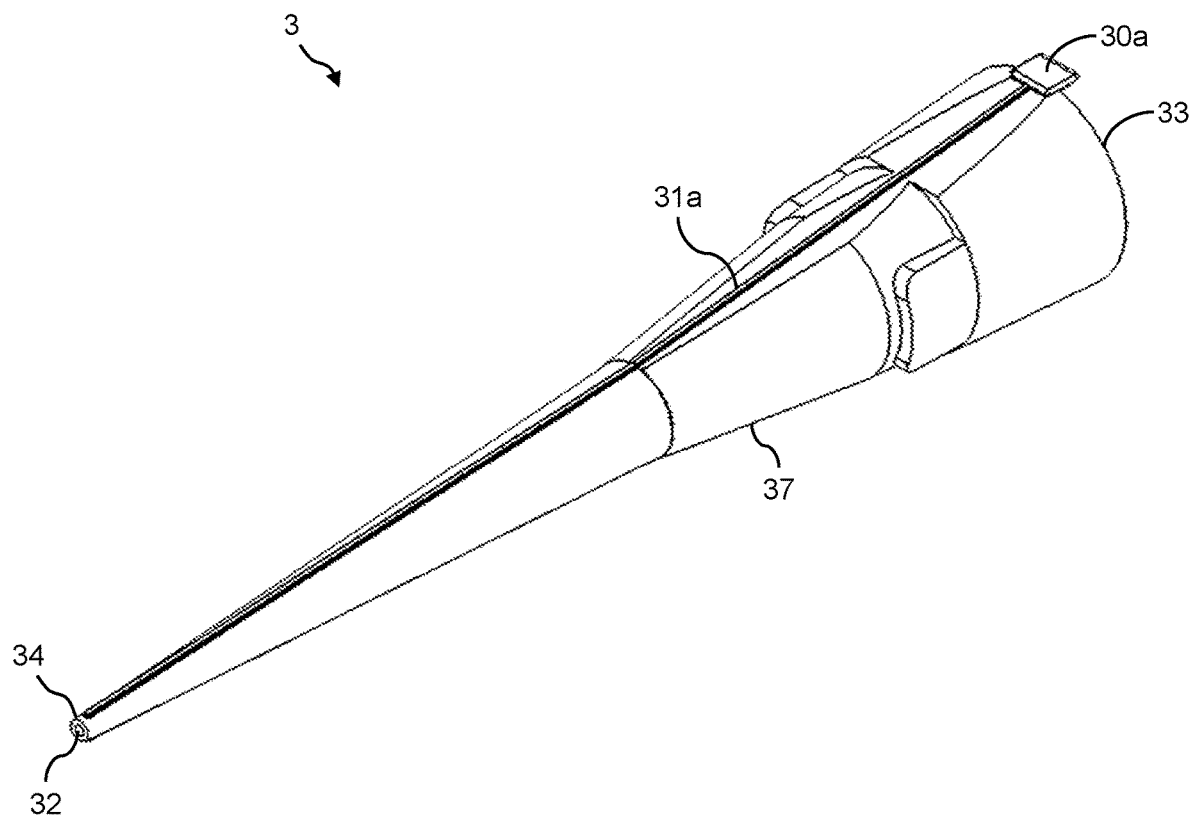
Figure 8B:
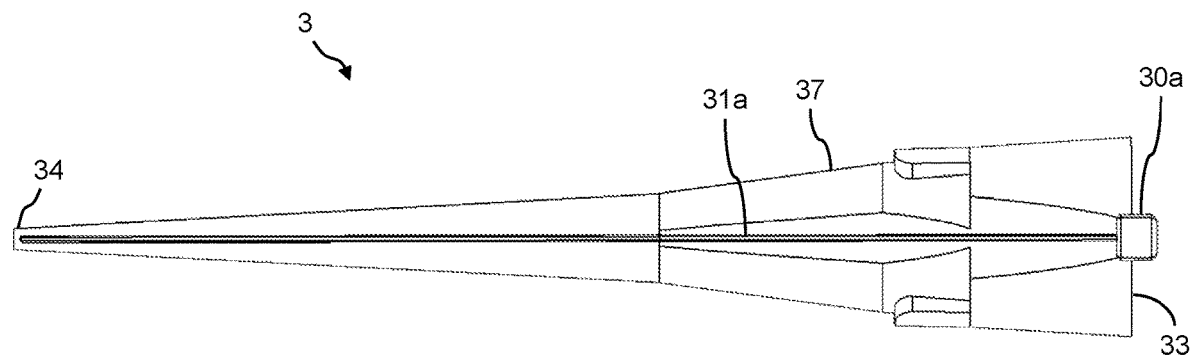
Figure 8C:
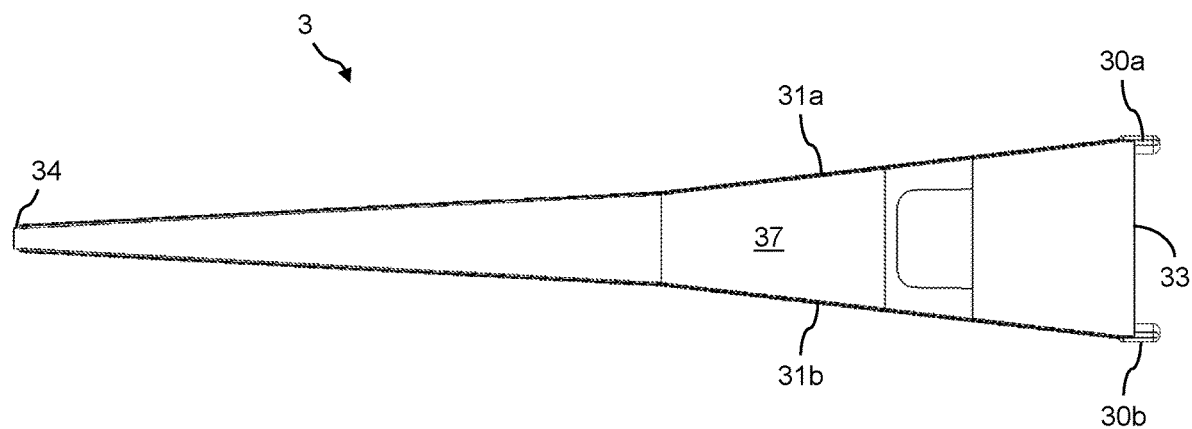
Figure 8D:
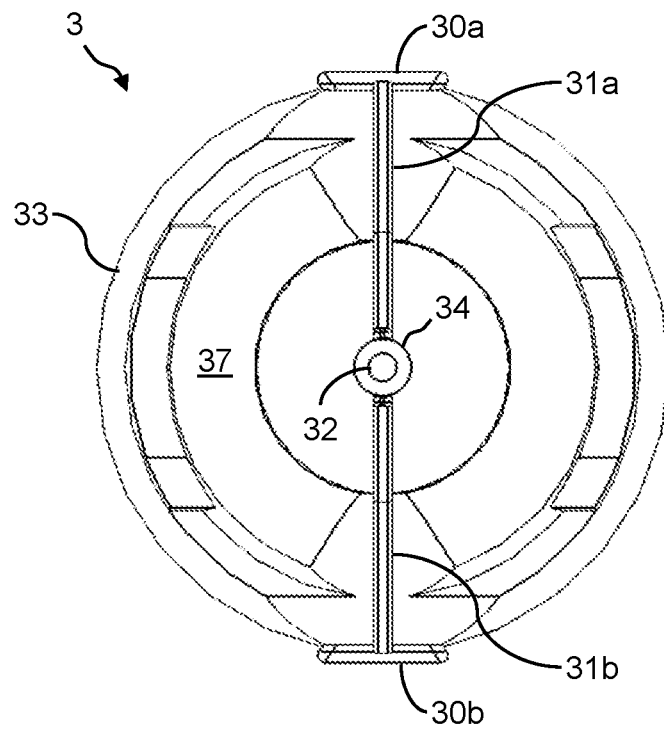
Figure 8E:
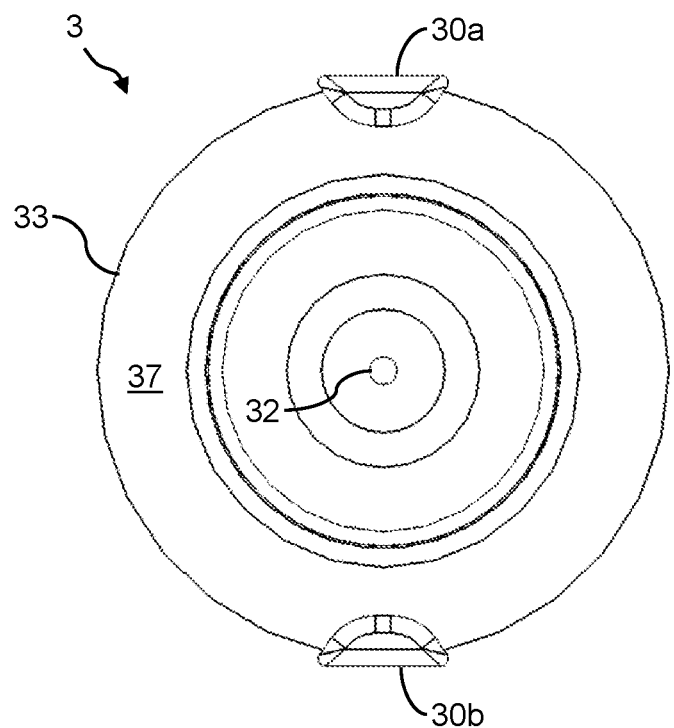

FIG. 8A, FIG. 8B, FIG. 8C, FIG. 8D, and FIG. 8E show various views of the pipette tip 3 according to another exemplary embodiment of the presently disclosed subject matter. Namely, FIG. 8A is a perspective view, FIG. 8B is a top view, FIG. 8C is a side view, FIG. 8D is an end view from the tip end, and FIG. 8E is an end view from the wide end of the pipette tip 3. The pipette tip 3 shown in FIG. 8A, FIG. 8B, FIG. 8C, FIG. 8D, and FIG. 8E is one example of a 20 μL pipette tip. While this example is in the context of a 20 μL pipette tip, this particular size is merely exemplary, and other sizes consistent with the objectives of this disclosure are also contemplated.

The 20 μL-pipette tip 3 includes the pair of conductive electrodes (e.g., the pipette tip electrodes 31a, 31b). In this example, the pipette tip electrodes 31a, 31b are narrow electrodes that run substantially along the full length of the 20 μL-pipette tip 3 and on the outside surface of the 20 μL-pipette tip 3. Further, each of the pipette tip electrodes 31 terminate near the securing end 33 of the 20 μL-pipette tip 3 via a tab (or ear) 30. Namely, the pipette tip electrode 31a terminates via a tab (or ear) 30a. Likewise, the pipette tip electrode 31b terminates via a tab (or ear) 30b. The tabs (or ears) 30a, 30b extend beyond the securing end 33 of the 20 μL-pipette tip 3. The tabs (or ears) 30a, 30b provide the electrical connection between the 20 μL-pipette tip 3 and the liquid handling apparatus 1. Again, the pipette tip electrodes 31a, 31b are fully separated from one another by electrically insulating material 37.

Figure 9A:
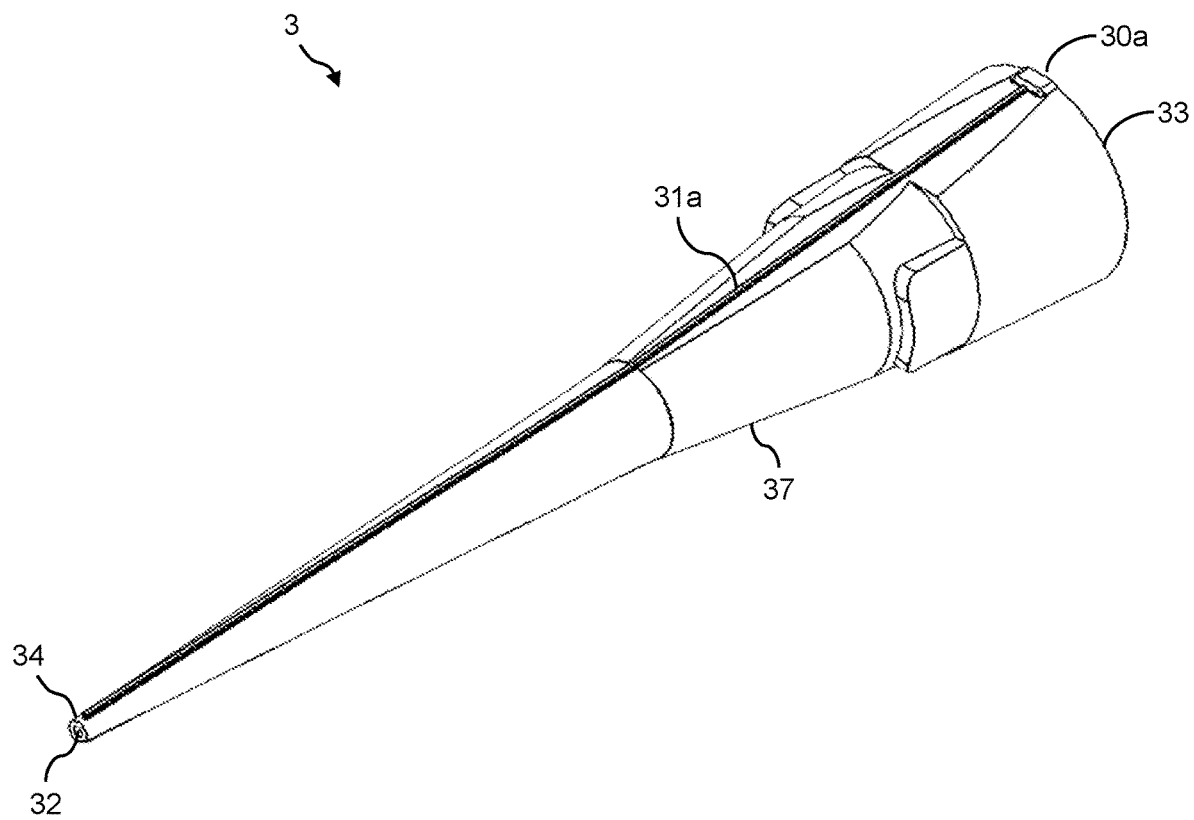
Figure 9B:
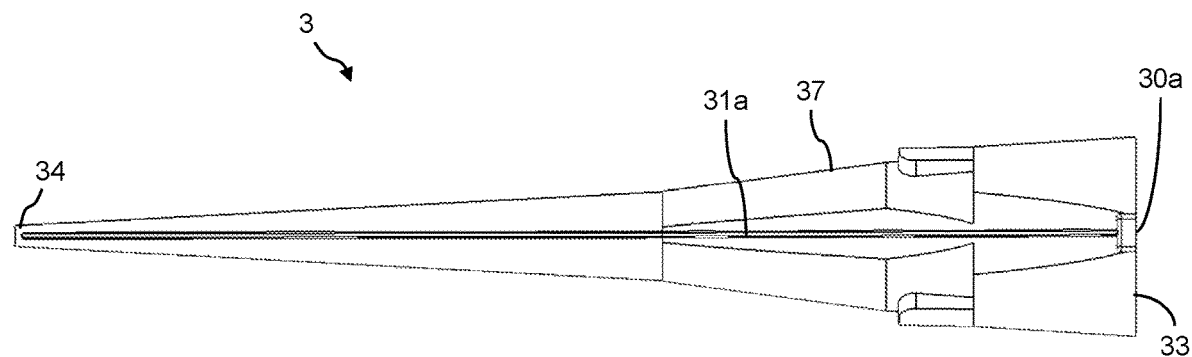
Figure 9C:
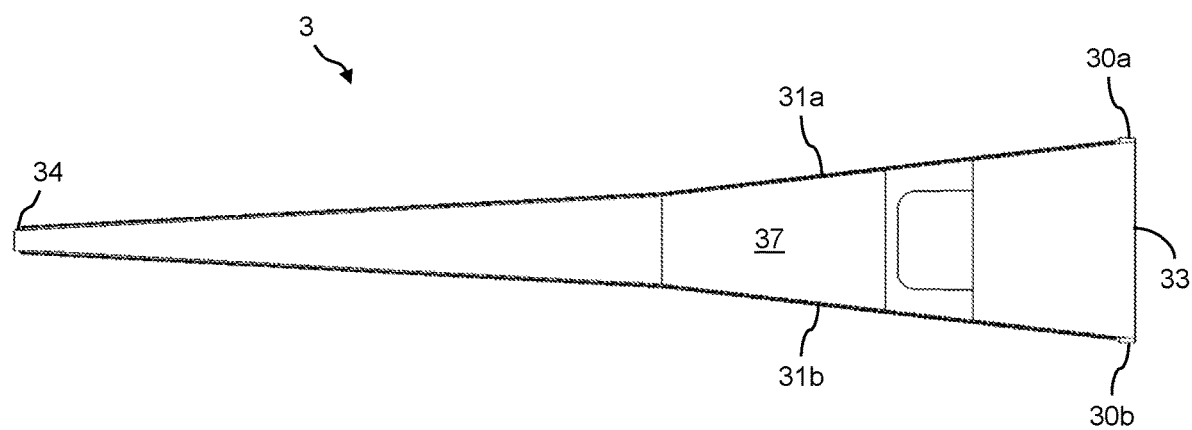
Figure 9D:
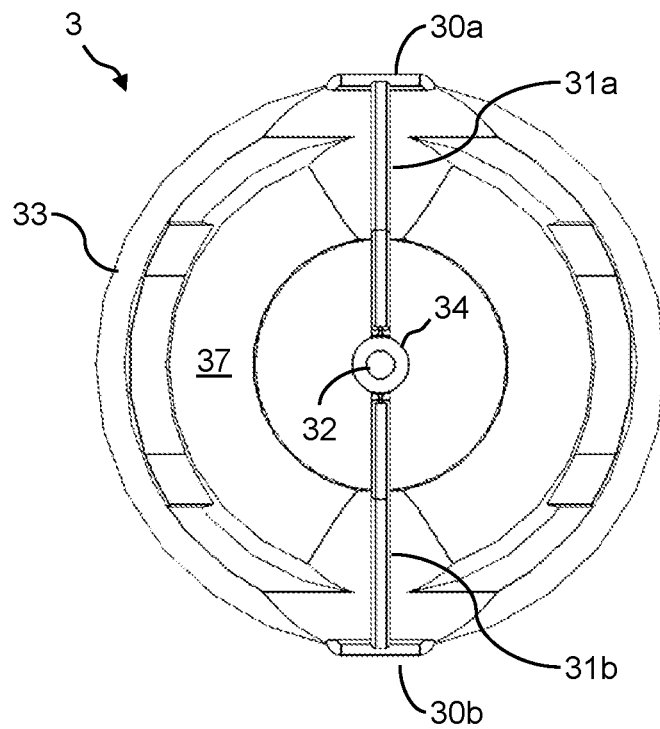
Figure 9E:
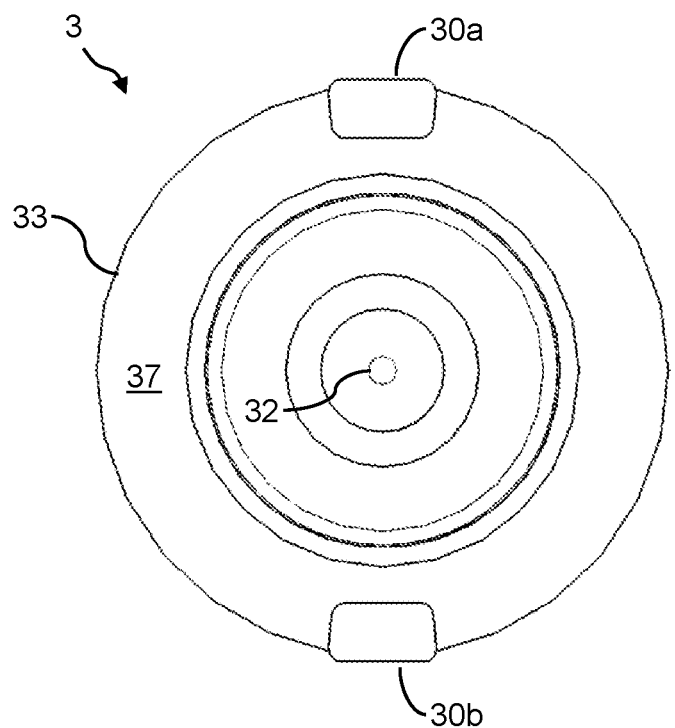

FIG. 9A, FIG. 9B, FIG. 9C, FIG. 9D, and FIG. 9E show various views of the pipette tip 3 according to another exemplary embodiment of the presently disclosed subject matter. Namely, FIG. 9A is a perspective view, FIG. 9B is a top view, FIG. 9C is a side view, FIG. 9D is an end view from the tip end, and FIG. 9E is an end view from the wide end of the pipette tip 3. The pipette tip 3 shown in FIG. 9A, FIG. 9B, FIG. 9C, FIG. 9D, and FIG. 9E is another example of a 20 μL pipette tip.

The 20 μL-pipette tip 3 shown in FIG. 9A, FIG. 9B, FIG. 9C, FIG. 9D, and FIG. 9E is substantially the same as the 20 μL-pipette tip 3 shown in FIG. 8A, FIG. 8B, FIG. 8C, FIG. 8D, and FIG. 8E except that the tabs (or ears) 30a, 30b do not extend beyond the securing end 33 of the 20 μL-pipette tip 3.

Figure 10A:
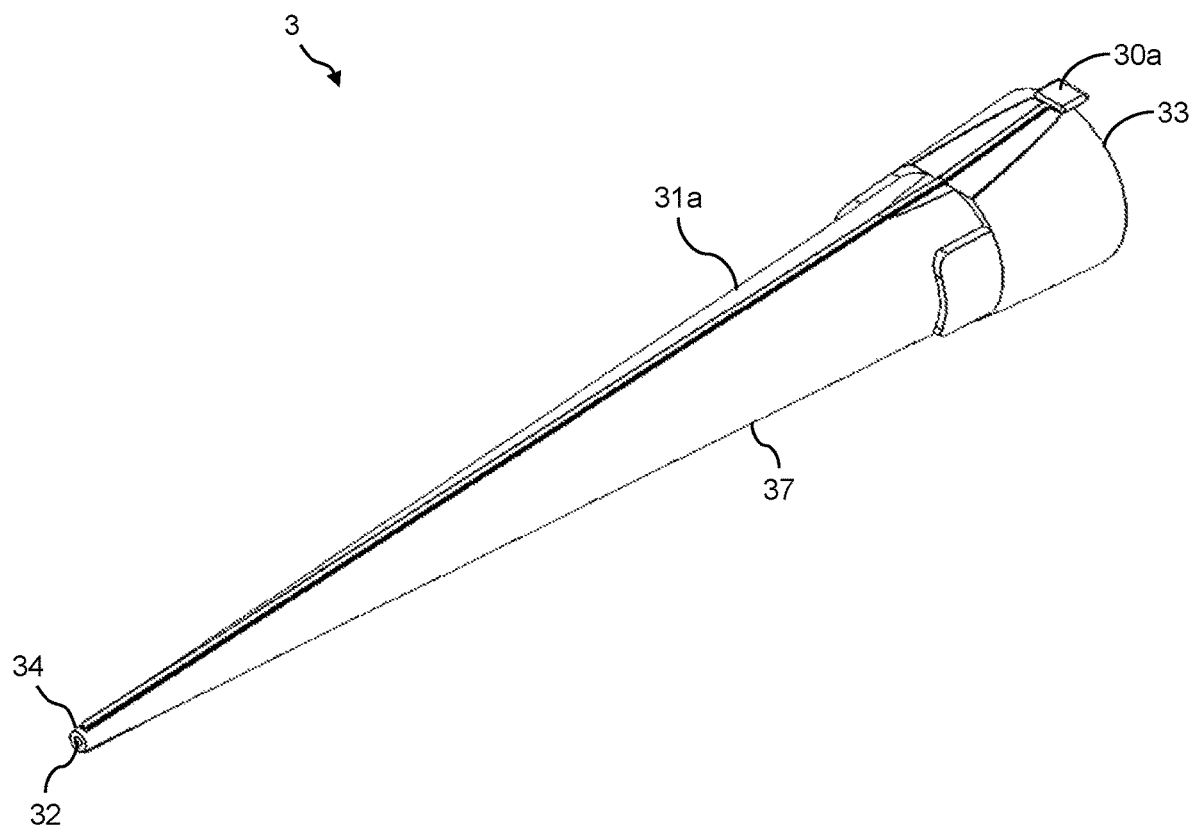
Figure 10B:
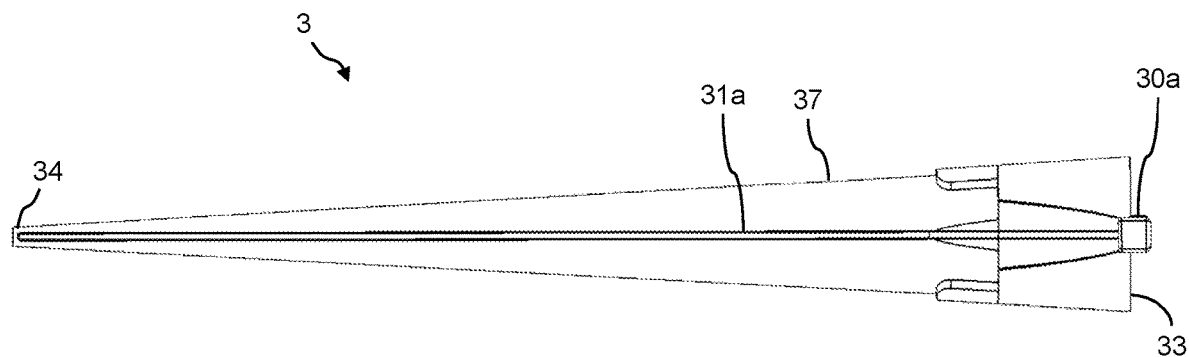
Figure 10C:
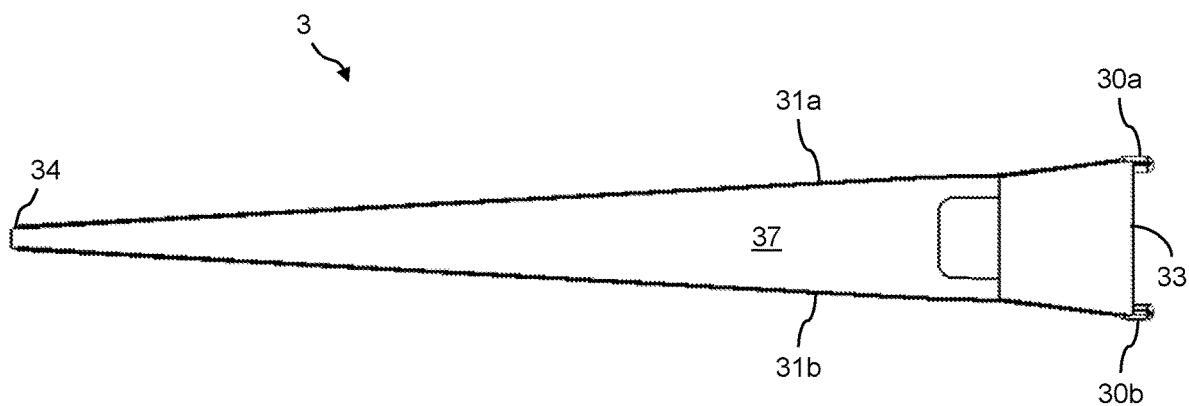
Figure 10D:
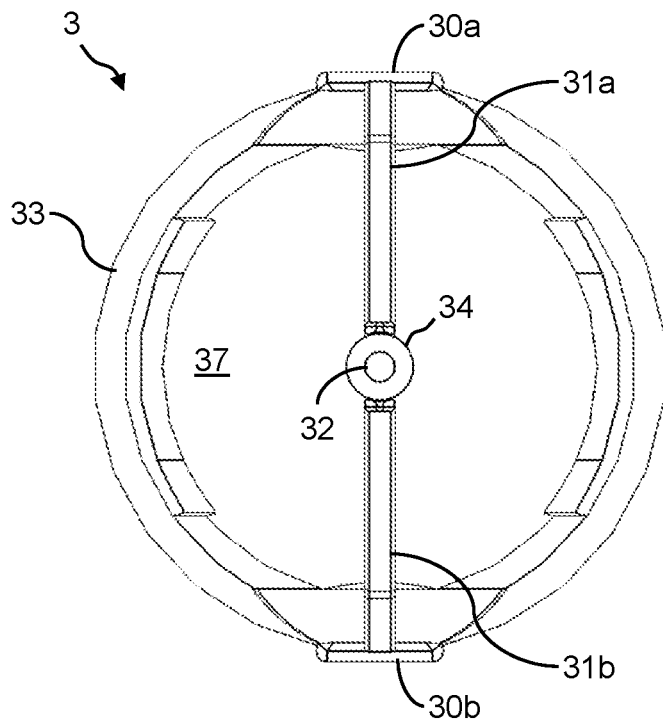
Figure 10E:
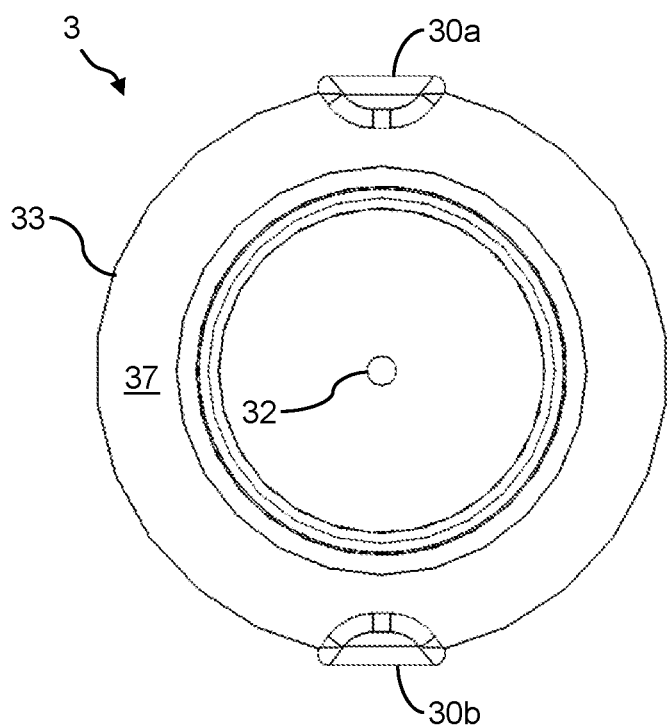

FIG. 10A, FIG. 10B, FIG. 10C, FIG. 10D, and FIG. 10E illustrate various views of a pipette tip 3 according to yet another exemplary embodiment of the presently disclosed subject matter. Namely, FIG. 10A is a perspective view, FIG. 10B is a top view, FIG. 10C is a side view, FIG. 10D is an end view from the tip end, and FIG. 10E is an end view from the wide end of the pipette tip 3. The pipette tip 3 shown in FIG. 10A, FIG. 10B, FIG. 10C, FIG. 10D, and FIG. 10E is one example of a 200 μL pipette tip. Again, while this example is in the context of a 200 μL pipette tip, this particular size is merely exemplary, and other sizes consistent with the objectives of this disclosure are also contemplated.

The 200 μL-pipette tip 3 includes the pair of conductive electrodes (e.g., the pipette tip electrodes 31a, 31b). In this example, the pipette tip electrodes 31a, 31b are narrow electrodes that run substantially along the full length of the 200 μL-pipette tip 3 and on the outside surface of the 200 μL-pipette tip 3. Further, each of the pipette tip electrodes 31 terminate near the securing end 33 of the 200 μL-pipette tip 3 via a tab (or ear) 30. Namely, the pipette tip electrode 31a terminates via the tab (or ear) 30a. Likewise, the pipette tip electrode 31b terminates via the tab (or ear) 30b. The tabs (or ears) 30a, 30b extend beyond the securing end 33 of the 200 μL-pipette tip 3. The tabs (or ears) 30a, 30b provide the electrical connection between the 200 μL-pipette tip 3 and the liquid handling apparatus 1. Again, the pipette tip electrodes 31a, 31b are fully separated from one another by electrically insulating material 37.

Figure 11A:
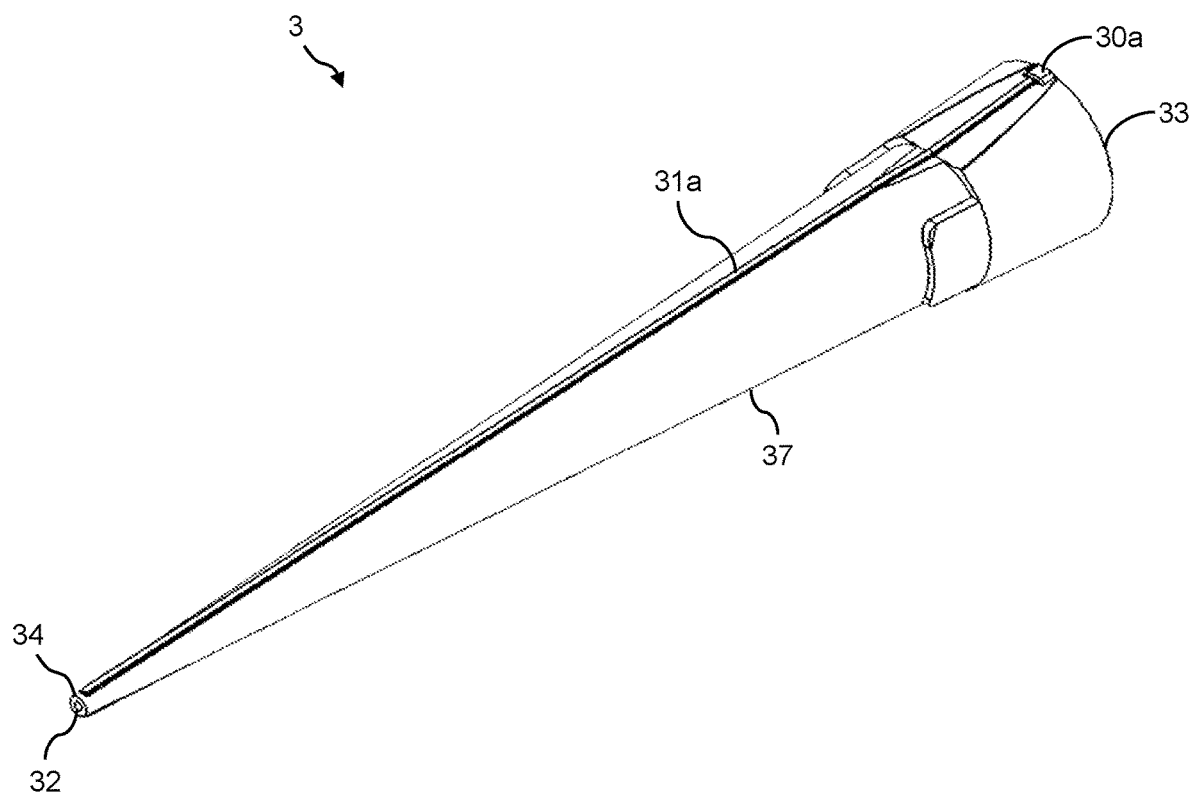
Figure 11B:
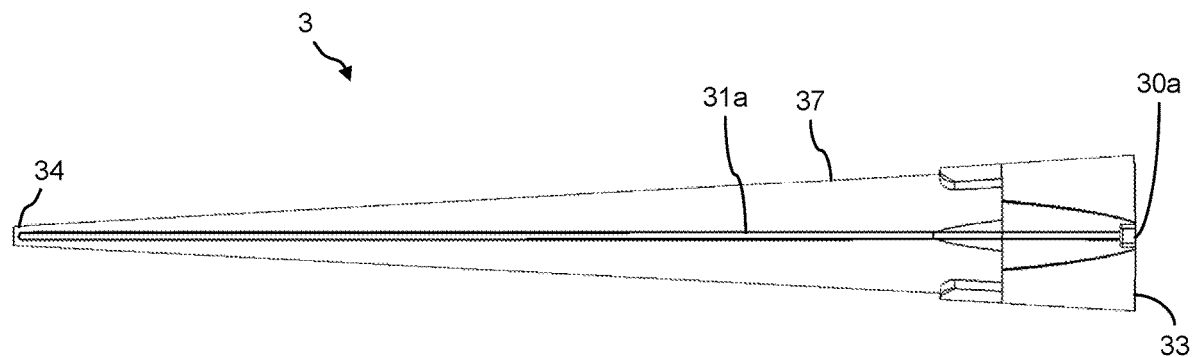
Figure 11C:
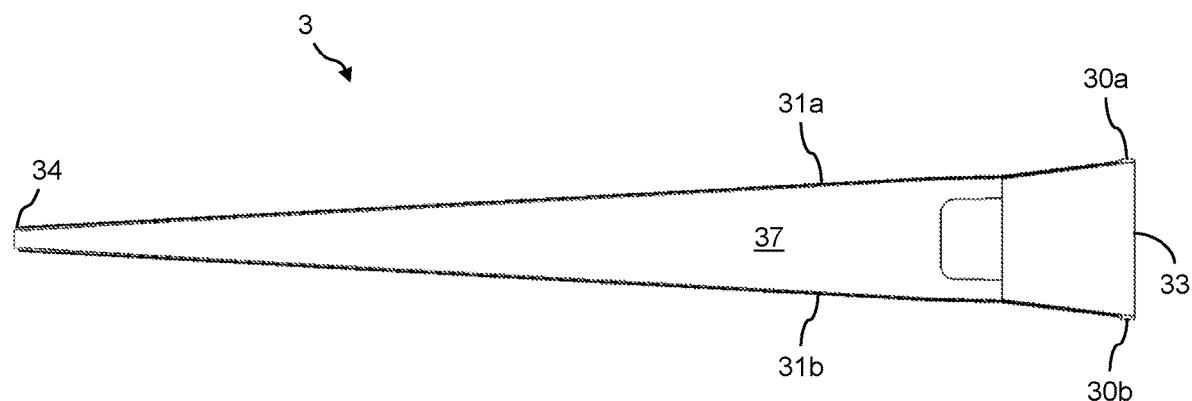
Figure 11D:
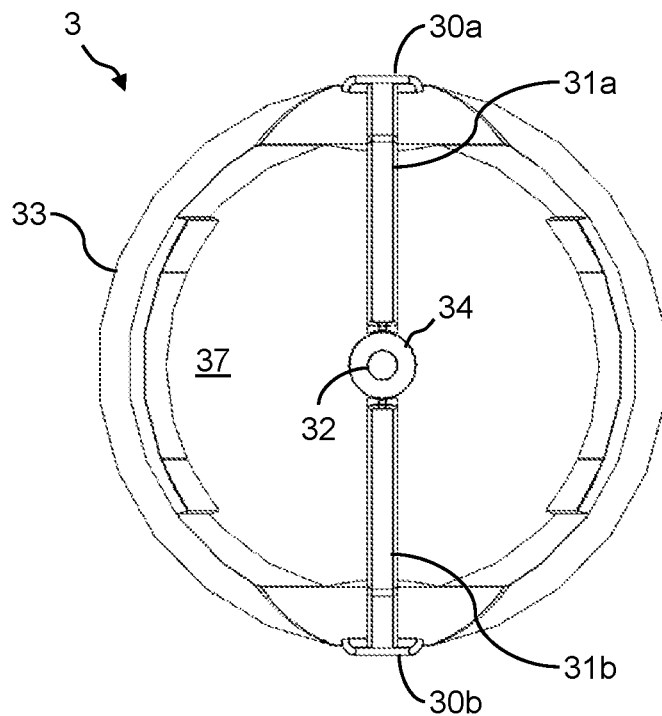
Figure 11E:
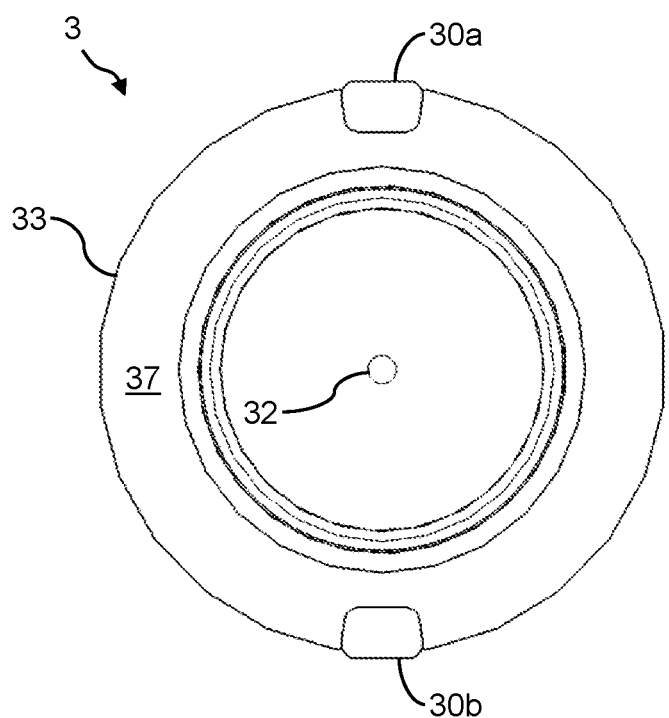

FIG. 11A, FIG. 11B, FIG. 11C, FIG. 11D, and FIG. 11E illustrate various views of a pipette tip 3 according to yet another exemplary embodiment of the presently disclosed subject matter. Namely, FIG. 11A is a perspective view, FIG. 11B is a top view, FIG. 11C is a side view, FIG. 11D is an end view from the tip end, and FIG. 11E is an end view from the wide end of the pipette tip 3. The pipette tip 3 shown in FIG. 11A, FIG. 11B, FIG. 11C, FIG. 11D, and FIG. 11E is another example of a 200 μL pipette tip.

The 200 μL-pipette tip 3 shown in FIG. 11A, FIG. 11B, FIG. 11C, FIG. 11D, and FIG. 11E is substantially the same as the 200 μL-pipette tip 3 shown in FIG. 10A, FIG. 10B, FIG. 10C, FIG. 10D, and FIG. 10E except that the tabs (or ears) 30a, 30b do not extend beyond the securing end 33 of the 200 μL-pipette tip 3.

Figure 12A:
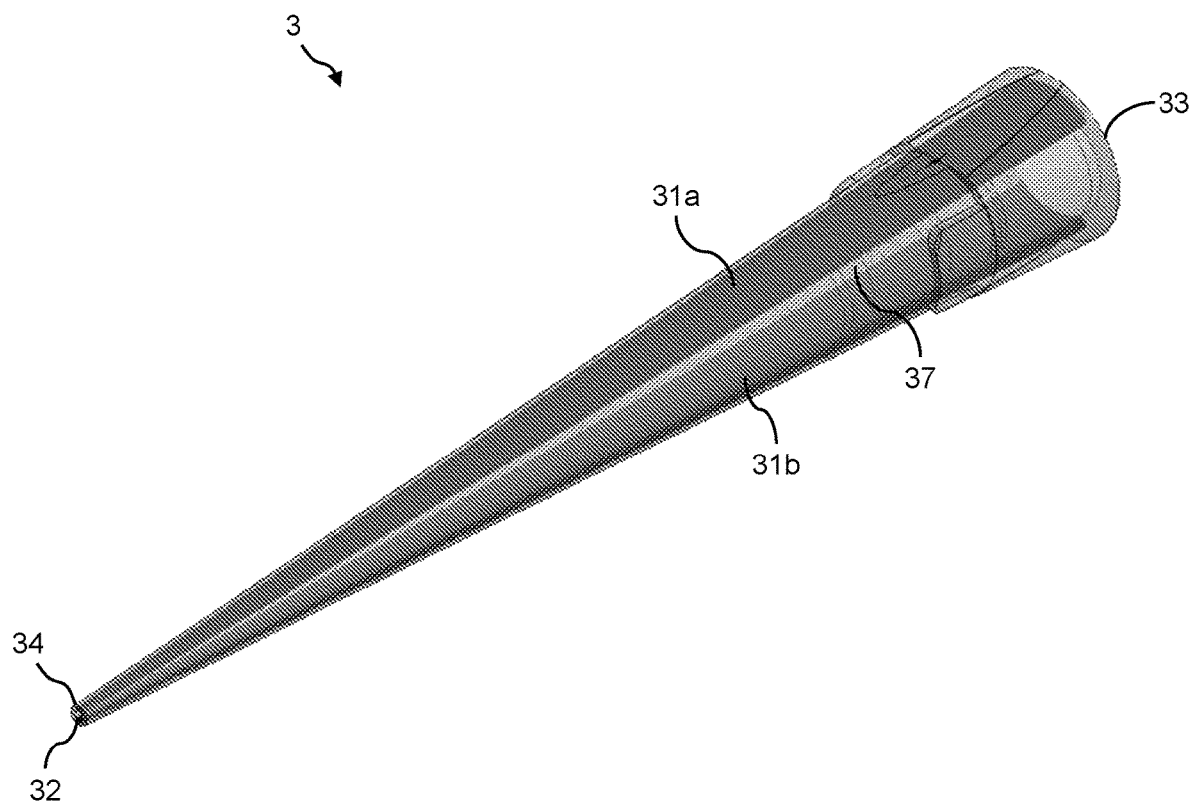
Figure 12B:
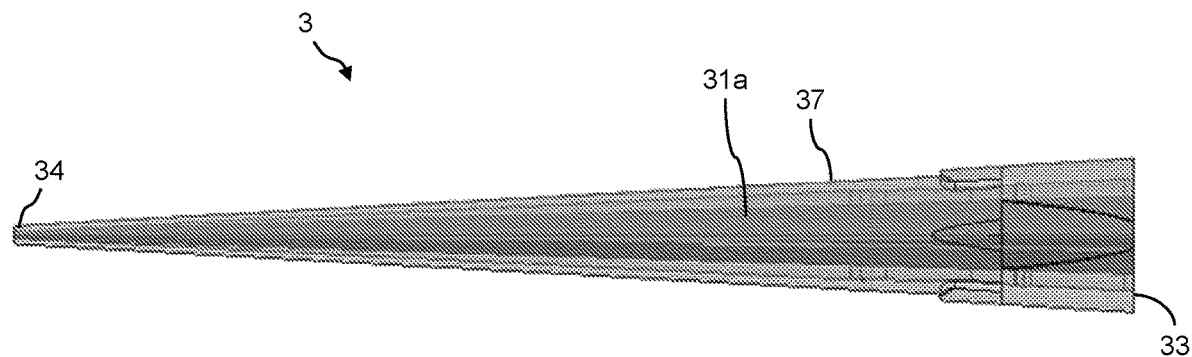
Figure 12C:
Figure 12D:
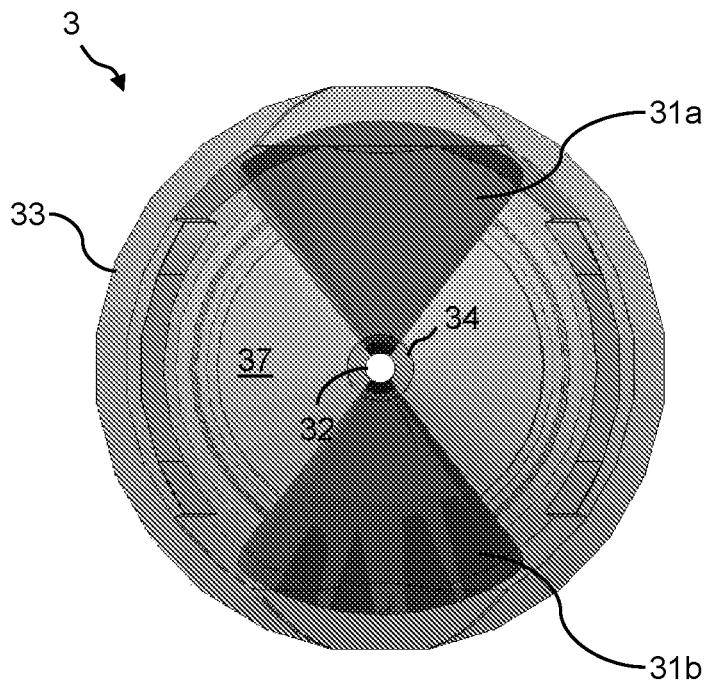
Figure 12E:
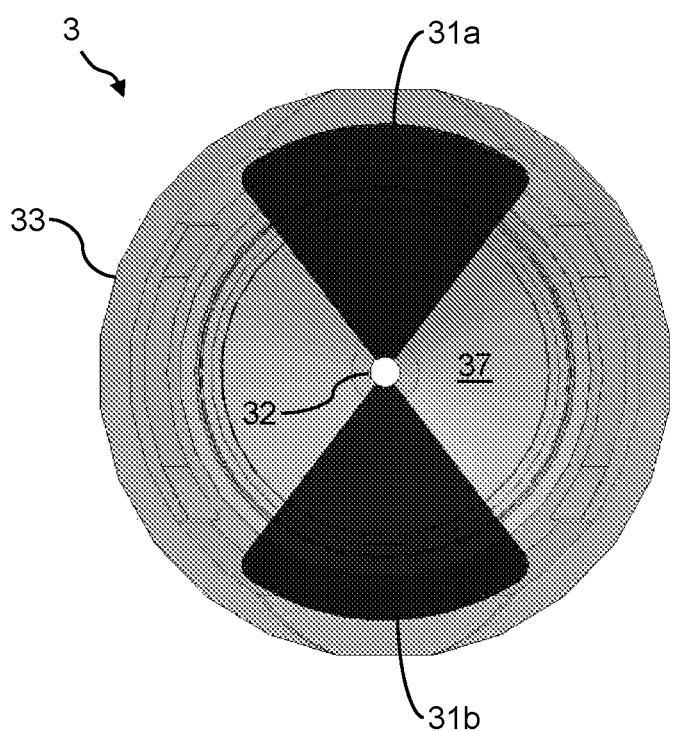

FIG. 12A, FIG. 12B, FIG. 12C, FIG. 12D, and FIG. 12E illustrate various views of a pipette tip 3 according to still another exemplary embodiment of the presently disclosed subject matter. Namely, FIG. 12A is a perspective view, FIG. 12B is a top view, FIG. 12C is a side view, FIG. 12D is an end view from the tip end, and FIG. 12E is an end view from the wide end of the pipette tip 3. The pipette tip 3 shown in FIG. 12A, FIG. 12B, FIG. 12C, FIG. 12D, and FIG. 12E is an example of a 200 μL pipette tip wherein the pipette tip electrodes 31a, 31b are located on the inside surface of the 200 μL-pipette tip 3. In some embodiments, as shown in FIGS. 12A-12E, the electrodes 31a, 31b are only positioned on an inner surface. However, in other embodiments, pipette tips 3 described herein can comprise electrodes on both the inner surface 35 and the outer surface 36 of the pipette tip 3. In these embodiments, there are four electrodes, such as a first, second, third and fourth electrode, where the first and second electrodes are positioned on an outer surface 36 of the pipette tip 3, and the third and fourth electrodes are positioned on an inner surface 35 of the pipette tip 3.

Further and referring now to FIG. 1 through FIG. 12E, there are many ways of making the presently disclosed pipette tips 3 that are disclosed hereinabove. In one example, the pipette tip 3 can be formed using dual injection molding processes. In another example, the pipette tip 3 can be formed using 3D printing processes to print conductive polypropylene strips onto the side of the tip. In yet another example, the pipette tip 3 can be formed according to the method described with reference to U.S. Pat. No. 5,045,286, entitled "Device for aspirating a fixed quantity of liquid," issued on Sep. 3, 1991. In still another example, the pipette tip 3 can be formed according to the method described with reference to U.S. Pat. No. 9,346,045, entitled "Electrically conductive pipette tip," issued on May 24, 2016.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

The invention claimed is:

1. A pipetting device for automatically maintaining a pipette tip depth and liquid level tracking in a conductive fluid during a fluid transfer operation, comprising:
 a pipette tip having a securing end with an opening, a fluid transferring end with an opening, an outer surface, and an inner surface, wherein the outer surface includes an electrically insulating material;
 a first and a second electrode on the outer surface of the pipette tip, the first and second electrode being separated by the electrically insulating material;
 a frame supporting an actuator that is operatively connected to the pipette tip, wherein the pipette tip is vertically oriented relative to the frame, and wherein the actuator is adapted to adjust a position of the pipette tip relative to the frame; and
 a controller that is in electrical connection with the first and second electrodes, wherein the first and second electrodes are adapted to send the controller a signal relative to a conductive fluid that comes in contact with the outer surface of the pipette tip; and wherein the controller is adapted to command the actuator to move the position of the pipette tip in response to the signal,
 wherein the actuator is a vertically linear actuator electrically connected to the controller that is in electrical connection with the first and second electrodes, and wherein the vertically linear actuator receives a resistance measurement input from the controller;
 the pipetting device further comprising:
 a linear motion guide, for the vertically linear actuator to travel along;
 a lead screw, configured to move the vertically linear actuator along the linear motion guide; and
 a pump, electrically connected to the controller, for aspirating or dispensing the conductive fluid,
 wherein during aspirating or dispensing of fluid in a fluid transfer operation, the controller provides resistance measurement input to the actuator to control movement of the actuator in a Z direction along the linear motion guide in accordance with a change in the resistance measurement input to thereby maintain a constant depth of the pipette tip with respect to a top surface of the fluid during the fluid transfer operation.

2. The pipetting device of claim 1, wherein each of the first and second electrodes extends the full longitudinal length of the pipette tip from the securing end to the fluid transferring end.

3. The pipetting device of claim 1, wherein each of the first and second electrodes terminate at a point near the securing end, wherein the point is where the first and second electrodes are electrically connected to the controller.

4. The pipetting device of claim 1, wherein each of the first and second electrodes terminates at a point near the fluid transferring end, wherein the point is where conductive fluid can reach.

5. The pipetting device of claim 1, wherein the signal from the first and second electrodes is a measurement of resistance relative to a conductive fluid.

6. The pipetting device of claim 5, wherein the first and second electrodes are made of copper.

7. The pipetting device of claim 5, wherein the first and second electrodes are made of electrically conductive polypropylene.

8. The pipetting device of claim 1, further comprising first and second electrical points, and first and second electrical wires connecting the first and second electrodes, respectively, to the controller.

* * * * *